US012623204B2

(12) United States Patent
Takahashi et al.

(10) Patent No.: US 12,623,204 B2
(45) Date of Patent: May 12, 2026

(54) ADSORPTION FILTER

(71) Applicant: KURARAY CO., LTD., Kurashiki (JP)

(72) Inventors: Keita Takahashi, Okayama (JP);
Tetsuya Hanamoto, Okayama (JP);
Hiroe Yoshinobu, Okayama (JP)

(73) Assignee: KURARAY CO., LTD., Kurashiki (JP)

( * ) Notice: Subject to any disclaimer, the term of this patent is extended or adjusted under 35 U.S.C. 154(b) by 811 days.

(21) Appl. No.: 17/912,929

(22) PCT Filed: Sep. 21, 2021

(86) PCT No.: PCT/JP2021/034551
§ 371 (c)(1),
(2) Date: Sep. 20, 2022

(87) PCT Pub. No.: WO2022/071019
PCT Pub. Date: Apr. 7, 2022

(65) Prior Publication Data
US 2023/0149901 A1     May 18, 2023

(30) Foreign Application Priority Data

Oct. 1, 2020     (JP) ................................. 2020-167069

(51) Int. Cl.
*B01J 20/28*     (2006.01)
*B01D 39/20*     (2006.01)
*B01J 20/20*     (2006.01)
*B01J 20/30*     (2006.01)

(52) U.S. Cl.
CPC .... *B01J 20/28073* (2013.01); *B01D 39/2058* (2013.01); *B01J 20/20* (2013.01); *B01J 20/2803* (2013.01); *B01J 20/28042* (2013.01); *B01J 20/28085* (2013.01); *B01J 20/28092* (2013.01); *B01J 20/3007* (2013.01); *B01J 2220/46* (2013.01)

(58) Field of Classification Search
CPC .............. B01J 20/28073; B01J 20/2803; B01J 20/28042; B01J 20/28085; B01J 20/28092; B01J 20/3007; B01D 39/2058
See application file for complete search history.

(56) References Cited

U.S. PATENT DOCUMENTS

| | | | |
|---|---|---|---|
| 10,987,650 B2 * | 4/2021 | Takahashi | .......... B01J 20/28085 |
| 2012/0132578 A1 | 5/2012 | Yoshinobu et al. | |
| 2019/0022624 A1 | 1/2019 | Yamanoi et al. | |
| 2020/0398247 A1 * | 12/2020 | Takahashi | .......... B01J 20/28071 |
| 2021/0252473 A1 | 8/2021 | Sato et al. | |

FOREIGN PATENT DOCUMENTS

| | | | | |
|---|---|---|---|---|
| CN | 108698833 A | 10/2018 | | |
| JP | 2015033680 A | 2/2015 | | |
| JP | 2015112518 A | 6/2015 | | |
| JP | 2016140788 A | 8/2016 | | |
| JP | 2020019016 A | 2/2020 | | |
| JP | 2021122778 A | 8/2021 | | |
| WO | WO-2011016548 A1 | 2/2011 | | |
| WO | WO-2019131305 A1 * | 7/2019 | .............. | B01J 20/20 |
| WO | WO-2019235043 A1 | 12/2019 | | |
| WO | WO-2021157272 A1 | 8/2021 | | |

OTHER PUBLICATIONS

International Preliminary Report on Patentability and Written Opinion issued Apr. 13, 2023 in PCT/JP2021/034551 (with English translation), 10 pages.
International Search Report issued Nov. 22, 2021 in PCT/JP2021/034551 (with English translation), 4 pages.
Notice of Opposition issued Jun. 20, 2023 in Japanese Patent No. 7180036 (with partial English translation), 15 pages.
Notice of Opposition issued Sep. 12, 2023 in Japanese Patent Application No. 2023-700543 with partial English translation, 24 pages.

* cited by examiner

*Primary Examiner* — Yong L Chu
(74) *Attorney, Agent, or Firm* — Element IP, PLC

(57) ABSTRACT

The adsorption filter according to the present invention is formed from a molded body including activated carbon and a binder, the pore volume of pores having a diameter of 10 $\mu$m or greater in terms of the volume of the adsorption filter as measured through mercury intrusion being 0.10 cm³/cc to 0.39 cm³/cc.

20 Claims, 8 Drawing Sheets

6

CUT-OUT PIECE

CUT PIECE OF
1 cm SQUARE

MEASUREMENT

CUT-OUT PIECE

HEAT TREATMENT AT 900°C

ADSORPTION FILTER

TECHNICAL FIELD

The present invention relates to an adsorption filter including a molded body containing activated carbon and a binder.

BACKGROUND ART

In recent years, there has been an increasing concern about safety and health related to water quality of tap water, and it is desired to remove harmful substances such as free residual chlorine, volatile organic compounds (VOCs) such as trihalomethanes, agricultural chemicals, and mold odor contained in tap water.

In order to remove such harmful substances, an adsorption filter including an activated carbon molded body is generally used.

The adsorption filter including an activated carbon molded body is also desired to have performance of removing turbid components (particulate substances) contained in tap water. Therefore, for example, Patent Literature 1 discloses a method for producing a turbidity reduction filter body that can be used for a longer period of time by adjusting a difference in hardness between an inflow filter medium portion and an outflow filter medium portion of an activated carbon molded body. Further, for example, Patent Literature 2 discloses a water purification cartridge including an activated carbon molded body and a nonwoven fabric, the water purification cartridge being capable of achieving both high turbidity removal performance and a sufficiently long clogging prevention life. Further, for example, Patent Literature 3 discloses an activated carbon molded body obtained by molding a mixture containing a powdered activated carbon (a) having a center particle size of 80 μm to 120 μm and a standard deviation σg in particle size distribution of 1.3 to 1.9, and a fibrous binder (b). Patent Literature 3 states that the activated carbon molded body is excellent in the ability to remove free residual chlorine, volatile organic compounds, CAT, and 2-MIB, and is also excellent in the ability to filtrate turbidity.

CITATION LIST

Patent Literatures

Patent Literature 1: JP 2015-033680 A
Patent Literature 2: JP 2016-140788 A
Patent Literature 3: WO 2011/016548 A

SUMMARY OF INVENTION

An object of the present invention is to provide an adsorption filter having excellent ultrafine particle removal performance while maintaining good water permeability.

As a result of intensive studies to solve the above problems, the present inventors have reached the present invention.

An adsorption filter according to an aspect of the present invention is an adsorption filter comprising a molded body containing activated carbon and a binder, wherein a pore volume of pores having a pore diameter of 10 μm or more on a volume basis of the adsorption filter is 0.10 cm³/cc to 0.39 cm³/cc, the pore volume being measured by mercury intrusion porosimetry.

Alternatively, an adsorption filter according to another aspect of the present invention is an adsorption filter comprising a molded body containing activated carbon and a binder, wherein a pore volume of pores having a pore diameter of 7 μm or less on a volume basis of the adsorption filter is 0.15 cm³/cc or more, the pore volume being measured by mercury intrusion porosimetry; and a total pore volume on a volume basis of the adsorption filter is 0.50 cm³/cc to 0.73 cm³/cc, the total pore volume being measured by mercury intrusion porosimetry.

DESCRIPTION OF EMBODIMENTS

Figure 1:
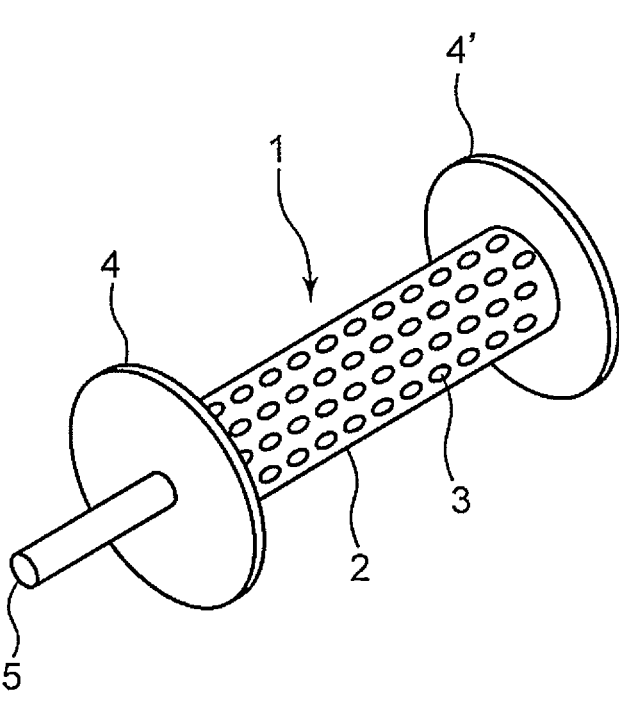
FIG. 1 is a perspective view showing an example of a mold for preparing an adsorption filter in the present embodiment.

In the activated carbon molded bodies of Patent Literatures 1, 2, and 3 described above, turbidity removal performance is evaluated. A turbidity removal performance test performed on a filter of an activated carbon molded body is generally specified in, for example, JIS S 3201: 2019. In this test, about 1 μm to 20 μm of kaolin is used as a turbidity component (particulate substance), and the removal performance thereof is evaluated. In the evaluations of the activated carbon molded bodies of Patent Literatures 1, 2, and 3, turbidity removal performance is evaluated based on the test.

However, recently, from the viewpoint of further safety and health, an adsorption filter including an activated carbon molded body is required to have performance of removing not only fine particles (generally, particles with a particle size of 1 μm to 20 μm) and but also ultrafine particles having a particle size of 1 μm or less.

The activated carbon molded body includes a wet molded body and a dry molded body according to the production method thereof. The wet molded body has a relatively low density, tends to have a low water flow resistance, and also has excellent performance of removing organic compounds and the like which are generally considered to be harmful. However, it is presumably difficult to provide the wet molded body with performance of removing even ultrafine particles because the wet molded body has low density and low water flow resistance. On the other hand, the dry molded body has a higher density than that of the wet molded body. Therefore, the dry molded body, although the ultrafine particle removal performance can be expected, has an increased water flow resistance, and thus is not suitable for applications such as a water purification filter. Therefore, an adsorption filter that includes an activated carbon molded body and that is capable of achieving both low water flow resistance and ultrafine particle removal performance is required.

Hereinafter, embodiments of the present invention will be described in detail. The scope of the present invention is not limited to the embodiment described herein, and various modifications can be made without impairing the gist of the present invention.

The adsorption filter in the present embodiment is an adsorption filter including a molded body containing activated carbon and a binder, wherein a pore volume of pores having a pore diameter of 10 μm or more on a volume basis of the adsorption filter is 0.10 $cm^3/cc$ to 0.39 $cm^3/cc$, the pore volume being measured by mercury intrusion porosimetry.

Alternatively, the adsorption filter according to another embodiment is an adsorption filter including a molded body containing activated carbon and a binder, wherein a pore volume of pores having a pore diameter of 7 μm or less on a volume basis of the adsorption filter is 0.15 $cm^3/cc$ or more, the pore volume being measured by mercury intrusion porosimetry, and a total pore volume on a volume basis of the adsorption filter is 0.50 $cm^3/cc$ to 0.73 $cm^3/cc$, the total pore volume being measured by mercury intrusion porosimetry.

Such a configuration can provide an adsorption filter having excellent ultrafine particle removal performance while maintaining good water permeability.

Specifically, by appropriately selecting and appropriately adjusting the physical properties, blending ratio, and the like of activated carbon as a raw material, the volume of voids in the filter is appropriately controlled, and the pore volume of pores having a predetermined pore diameter or more is adjusted to fall within a specific range. As a result, both water permeability and ultrafine particle removal performance can be achieved.

[Physical Properties of Adsorption Filter]

In the adsorption filter in the present embodiment, the pore volume of pores having a pore diameter of 10 μm or more on a volume basis of the adsorption filter (hereinafter, also simply referred to as a "pore volume of pores having a pore diameter of 10 μm or more") is 0.10 $cm^3/cc$ to 0.39 $cm^3/cc$, the pore volume being measured by mercury intrusion porosimetry. When the pore volume of pores having a pore diameter of 10 μm or more is 0.10 $cm^3/cc$ or more, good water permeability can be maintained in the adsorption filter of the present embodiment. When the pore volume of pores having a pore diameter of 10 μm or more is 0.39 $cm^3/cc$ or less, the adsorption filter in the present embodiment is remarkably excellent in ultrafine particle removal performance.

The pore volume of pores having a pore diameter of 10 μm or more is preferably 0.37 $cm^3/cc$ or less, more preferably 0.35 $cm^3/cc$ or less, and still more preferably 0.33 $cm^3/cc$ or less. The pore volume of pores having a pore diameter of 10 μm or more is preferably 0.12 $cm^3/cc$ or more, and more preferably 0.15 $cm^3/cc$ or more.

Further, in the adsorption filter in the present embodiment, the total pore volume on a volume basis of the adsorption filter (hereinafter, also simply referred to as "total pore volume") is preferably 0.50 $cm^3/cc$ to 0.73 $cm^3/cc$, the total pore volume being measured by mercury intrusion porosimetry. When the total pore volume is 0.50 $cm^3/cc$ or more, the adsorption filter can obtain more excellent water permeability, and can be suitably used for, for example, applications such as a water purification filter. When the total pore volume is 0.73 $cm^3/cc$ or less, a sufficient amount of activated carbon can be retained, and adsorption performance as a general filter can be improved.

The total pore volume is more preferably 0.53 $cm^3/cc$ or more, and still more preferably 0.56 $cm^3/cc$ or more. The total pore volume is more preferably 0.70 $cm^3/cc$ or less, and still more preferably 0.67 $cm^3/cc$ or less.

In the adsorption filter according to another embodiment, the pore volume of pores having a pore diameter of 7 μm or less on a volume basis of the adsorption filter (hereinafter, also simply referred to as a "pore volume of pores having a pore diameter of 7 μm or less") is 0.15 $cm^3/cc$ or more, and the total pore volume is 0.50 $cm^3/cc$ to 0.73 $cm^3/cc$, the pore volume and the total pore volume being measured by mercury intrusion porosimetry. When the pore volume of pores having a pore diameter of 7 μm or less is 0.15 $cm^3/cc$ or more, the adsorption filter of the present embodiment is remarkably excellent in ultrafine particle removal performance. When the total pore volume is in a range of 0.50 $cm^3/cc$ to 0.73 $cm^3/cc$ at the same time, the adsorption filter can maintain good water permeability, and can have good adsorption performance as a general filter.

The pore volume of pores having a pore diameter of 7 μm or less is preferably 0.16 $cm^3/cc$ or more, more preferably 0.17 $cm^3/cc$ or more, and still more preferably 0.18 $cm^3/cc$ or more. The upper limit of the pore volume of pores having a pore diameter of 7 μm or less is not particularly limited, but for example, the pore volume of pores having a pore diameter of 7 μm or less is preferably 0.30 $cm^3/cc$ or less, and more preferably 0.28 $cm^3/cc$ or less.

The preferred upper limit value and lower limit value of the total pore volume in the adsorption filter of another embodiment are the same as those in the case of the adsorption filter of the embodiment described above.

In the adsorption filter in still another embodiment, it is preferable that the pore volume of pores having a pore diameter of 10 μm or more is 0.10 $cm^3/cc$ to 0.39 $cm^3/cc$, the pore volume of pores having a pore diameter of 7 μm or less is 0.15 $cm^3/cc$ or more, and the total pore volume is preferably 0.50 $cm^3/cc$ to 0.73 $cm^3/cc$. In other words, it is preferable that the adsorption filter satisfies both conditions defined in the two embodiments described above.

In addition, in the adsorption filter in the present embodiment, the proportion of the pore volume of pores having a pore diameter of 10 μm or more in the total pore volume is preferably 12% or more. When the proportion of the pore volume of pores having a pore diameter of 10 μm or more is 12% or more, the adsorption filter can obtain more excellent ultrafine particle removal performance. The proportion of the pore volume of pores having a pore diameter of 10 μm or more is more preferably 15% or more, still more preferably 20% or more, particularly preferably 25% or more, and most preferably 30% or more. The proportion of the pore volume of pores having a pore diameter of 10 μm or more is preferably 80% or less, more preferably 65% or less, and still more preferably 60% or less.

Further, in the adsorption filter in the present embodiment, the proportion of the pore volume of pores having a pore diameter of 7 μm or less in the total pore volume is preferably 22% or more. When the proportion of the pore volume of pores having a pore diameter of 7 μm or less is 22% or more, the adsorption filter can obtain more excellent ultrafine particle removal performance. The proportion of the pore volume of pores having a pore diameter of 7 μm or less is more preferably 25% or more. The proportion of the pore volume of pores having a pore diameter of 7 μm or less is preferably 48% or less, and more preferably 45% or less.

In addition, in the adsorption filter in the present embodiment, preferably, the pore mode diameter measured by mercury intrusion porosimetry (hereinafter, also simply referred to as a "pore mode diameter") is 15 μm or less. When the pore mode diameter is 15 μm or less, the adsorption filter can obtain more excellent ultrafine particle removal performance.

The pore mode diameter is more preferably 13 μm or less, and still more preferably 11 μm or less. The lower limit of the pore mode diameter is not particularly limited as long as extremely small pore mode diameter does not significantly affect the water permeability of the filter. The pore mode diameter is preferably, for example, 6 μm or more, and more preferably 7 μm or more.

In the present specification, the pore volume of pores having a pore diameter of 10 μm or more, the pore volume of pores having a pore diameter of 7 μm or less, the total pore volume, and the pore mode diameter, which are measured by mercury intrusion porosimetry, can be measured by a mercury intrusion porosimetry pore volume measuring apparatus ("MicroActive AutoPore V 9620" manufactured by Micromeritics Instrument Corporation), as described in Examples below. Further, from these measured values of the pore volume, the proportion (%) of the pore volume of pores having a pore diameter of 10 μm or more in the total pore volume and the proportion (%) of the pore volume of pores having a pore diameter of 7 μm or less in the total pore volume can be determined. In Examples described later, a molded layer of a filter is cut into a square with a size of about 1 cm and used as a measurement sample, but the size of the measurement sample is preferably changed as appropriate depending on the size of the filter. For example, in the case of a faucet-mounted filter, it is desirable to perform measurement with a measurement sample of about 5 mm square.

The values of the pore volume of pores having a pore diameter of 10 μm or more, the pore volume of pores having a pore diameter of 7 μm or less, the total pore volume, and the pore mode diameter in the adsorption filter of the present embodiment as described above can be controlled by various methods. By controlling the value of the pore volume, it is also possible to simultaneously control the proportion of the pore volume of pores having a pore diameter of 10 μm or more in the total pore volume and the proportion of the pore volume of pores having a pore diameter of 7 μm or less in the total pore volume. The values can be controlled by appropriately selecting and appropriately adjusting, for example, the physical properties and the blending amount of activated carbon as a raw material, and when two or more types of activated carbons having different physical properties are used, the blending ratio thereof, the type and blending amount of a binder as a raw material, the blending amount of an optional component as a raw material, and treatment conditions (suction pressure, drying time, and the like) in the production of an adsorption filter. In particular, as will be described in detail later, it is preferable to control the values of the pore volume of pores having a pore diameter of 10 μm or more, the pore volume of pores having a pore diameter of 7 μm or less, the total pore volume, and the pore mode diameter by using two or more types of activated carbons having different physical properties as raw materials.

The density of the adsorption filter (hereinafter, also simply referred to as "density of the filter") in the present embodiment is preferably 0.59 g/cm³ or less. When the density of the filter is 0.59 g/cm³ or less, the water flow resistance can be more favorably maintained, and a filter having a such a density can be suitably used for, for example, a water purification filter. In addition, setting such a density can suppress clogging of the filter. The density of the filter is preferably 0.35 g/cm³ or more. When the density of the filter is 0.35 g/cm³ or more, the total amount of activated carbon is a suitable amount, and performance of removing ultrafine particles and other normal harmful substances can be favorably maintained.

The density of the filter is more preferably 0.38 g/cm³ or more, still more preferably 0.40 g/cm³ or more, and particularly preferably 0.42 g/cm³ or more. When the density of the filter is 0.38 g/cm³ or more, the adsorption filter has more excellent chloroform (harmful substance) removal performance. The density of the filter is more preferably 0.57 g/cm³ or less, still more preferably 0.55 g/cm³ or less, and particularly preferably 0.53 g/cm³ or less. In the present specification, the density of the filter can be measured by the method described in detail in the Examples below.

The value of density of the filter can be controlled by various methods. The value can be controlled by appropriately selecting and appropriately adjusting, for example, the physical properties and the blending amount of activated carbon as a raw material, and when two or more types of activated carbons having different physical properties are used, the blending ratio thereof, the type and blending amount of a binder as a raw material, the blending amount of an optional component as a raw material, and treatment conditions (suction pressure, drying time, and the like) in the production of an adsorption filter. In particular, as will be described in detail later, it is preferable to control the value of the density of the filter by using two or more types of activated carbons having different physical properties as raw materials.

In the adsorption filter in the present embodiment, the benzene saturated adsorption amount is preferably 18% to 35%. In the present specification, the benzene saturated adsorption amount of the adsorption filter can be determined, in accordance with the activated carbon test method of JIS K 1474: 2014, from an increase (%) in the amount of a sample when air containing solvent vapor having a solvent saturation concentration of 1/10 is passed through the sample at 25° C. and the mass of the sample becomes constant.

When the benzene saturated adsorption amount is 18% or more, sufficient removal performance particularly for organic substances can be obtained. When the benzene saturated adsorption amount is 35% or less, it is possible to prevent the pore diameter from increasing in the overactivated state, so that the possibility of deterioration of the ability to adsorb and retain harmful substances can be suppressed. The benzene saturated adsorption amount is more preferably 20% or more, and still more preferably 22% or more. The benzene saturated adsorption amount is more preferably 33% or less, and still more preferably 30% or less.

The benzene saturated adsorption amount of the adsorption filter in the present embodiment can be controlled by appropriately selecting and appropriately adjusting, for example, the physical properties and the blending amount of activated carbon as a raw material, and when two or more types of activated carbons having different physical properties are used, and the blending ratio thereof.

In a carbide obtained by heat-treating (hereinafter, also simply referred to as "heat treatment") the adsorption filter in the present embodiment at 900° C. for 20 minutes in an inert gas, specifically, nitrogen gas, the content of particles having a particle size of 10 μm or less is preferably 2 vol % or more.

Specifically, by subjecting the adsorption filter to such a heat treatment, components such as a binder are removed from the adsorption filter, leaving activated carbon in the adsorption filter as a carbide. In the particle size distribution of the remaining activated carbon (carbide after heat treatment) in the adsorption filter, when the content of the particles having a particle size of 10 or less is 2 vol % or more, the adsorption filter in the present embodiment before the heat treatment has more excellent ultrafine particle removal performance.

The content of activated carbon (carbide after heat treatment) particles having a particle size of 10 μm or less in the adsorption filter is more preferably 4 vol % or more, and still more preferably 6 vol % or more. The upper limit of the content of activated carbon particles having a particle size of 10 μm or less in the adsorption filter is not limited as long as activated carbon with an extremely small particle size does not significantly affect the water permeability of the adsorption filter in the present embodiment before heat treatment. The content may be, for example, 10 vol % or less.

The content of the activated carbon particles (carbide after heat treatment) having a particle size of 10 μm or less in the adsorption filter is a value that varies mainly depending on the physical properties of activated carbon as a raw material, and when two or more types of activated carbons having different physical properties are used, the blending ratio thereof. Therefore, the value can be controlled by appropriately selecting and appropriately adjusting the physical properties and the blending ratio.

Further, in the adsorption filter in the present embodiment, the 0% particle size (hereinafter, also simply referred to as "D0") in the volume-based cumulative particle size distribution of the activated carbon (carbide after heat treatment) in the adsorption filter is preferably 7 μm or less. When D0 is 7 μm or less, the adsorption filter in the present embodiment before heat treatment has more excellent ultrafine particle removal performance.

D0 of the activated carbon (carbide after heat treatment) in the adsorption filter is more preferably 5 μm or less, and still more preferably 3 μm or less. The lower limit of D0 is not limited as long as it does not significantly affect the water permeability of the adsorption filter before heat treatment. D0 may be, for example, 1 μm or more.

D0 of the activated carbon (carbide after heat treatment) in the adsorption filter is also a value that mainly varies depending on the physical properties of activated carbon as a raw material, and when two or more types of activated carbons having different physical properties are used, the blending ratio thereof. Therefore, the value can be controlled by appropriately selecting and appropriately adjusting the physical properties and the blending ratio.

In the present specification, the content of the activated carbon particles (carbide after heat treatment) having a particle size of 10 μm or less in the adsorption filter and D0 of the activated carbon (carbide after heat treatment) in the adsorption filter can be measured by, for example, a laser diffraction scattering method using a wet particle size distribution measuring apparatus ("Microtrac MT3300EX-II" manufactured by MicrotracBEL Corp.) or the like as in the case of the activated carbon as a normal raw material, as described in the following Examples.

[Configuration of Adsorption Filter]

The adsorption filter in the present embodiment includes a molded body containing an activated carbon and a binder.

(Activated Carbon)

The raw material activated carbon (preferably, granular activated carbon) used for the adsorption filter in the present embodiment is not particularly limited, and can be used alone or in combination of two or more types of activated carbons having different physical properties.

Examples of the physical properties of the activated carbon as a raw material include the packing density (g/cm³) of the activated carbon, the 10% particle size (hereinafter, also simply referred to as "D10") in the volume-based cumulative particle size distribution, the 50% particle size (hereinafter, also simply referred to as "D50") in the volume-based cumulative particle size distribution, and the 90% particle size (hereinafter, also simply referred to as "D90") in the volume-based cumulative particle size distribution.

In the present embodiment, two or more types of activated carbons having different physical properties are preferably used in combination. This is because by adjusting the blending ratio of activated carbons having different physical properties, the voids of the adsorption filter can be controlled when the adsorption filter is molded, and this makes it easy to adjust the pore volume of pores having a pore diameter of 10 μm or more (and/or the pore volume of pores having a pore diameter of 7 μm or less and the total pore volume) to be in the specific range defined in the present embodiment.

As the activated carbons having different physical properties, for example, powdered activated carbon X having smaller D10, D50 and/or D90 and containing a large amount of fine powder, and powdered activated carbon Y having larger D10, D50 and/or D90 are preferably used in combination. When the activated carbon X and the activated carbon Y are used in combination, the activated carbon Y is used in combination at a mass ratio larger than that of the activated carbon X. This causes excessively large voids formed by the activated carbon Y to be appropriately filled with the fine powder of the activated carbon X when the adsorption filter is molded. As a result, the voids of the molded body are appropriately controlled, and the pore volume of pores having a pore diameter of 10 μm or more (and/or the pore volume of pores having a pore diameter of 7 μm or less and the total pore volume) is adjusted to fall within the specific range defined in the present embodiment.

The particle size distribution of the activated carbon as a raw material is not particularly limited, but the content of particles having a particle size of 10 μm or less is preferably more than 2 vol %. Specifically, when the content of particles having a particle size of 10 μm or less is more than 2 vol % in the particle size distribution of the activated carbon as a raw material, the amount of fine powder contained in the activated carbon in the adsorption filter increases. As a result, the filter exhibits more excellent ultrafine particle removal performance. When two or more types of activated carbons are used in combination, the content of the activated carbon particles as a raw material having a particle size of 10 μm or less varies depending on the physical properties of each activated carbon, the blending ratio of each activated carbon, and the like. Therefore, the value can be controlled by appropriately selecting and appropriately adjusting the physical properties and the blending ratio.

The content of particles having a particle size of 10 μm or less in the activated carbon as a raw material is more preferably 3 vol % or more, still more preferably 4 vol % or more, and still more preferably 5 vol % or more. The upper limit of the content of particles having a particle size of 10 μm or less in the activated carbon as a raw material is not limited as long as excessive fine powder contained in the activated carbon in the adsorption filter does not significantly affect the water permeability of the adsorption filter to be molded. The content may be, for example, 15 vol % or less.

In the present specification, the values of the packing density, D10, D50, and D90 of the activated carbon as a raw material can be controlled by appropriately selecting and appropriately adjusting, for example, the type of carbonaceous material to be a raw material of the activated carbon described later, the activation treatment method of the carbonaceous material and the treatment conditions thereof (heating temperature, time, for example) in the production of the activated carbon, the pulverization conditions, and the classification conditions. Further, D10, D50, and D90, and the content of particles having a particle size of 10 μm or less in the activated carbon as a raw material can be analyzed and measured by, for example, a laser diffraction scattering method using a wet particle size distribution measuring apparatus ("Microtrac MT3300EX-II" manufactured by MicrotracBEL Corp.) or the like, as described in the following Examples.

As the activated carbon of a raw material, a commercially available product may be used. Alternatively, an activated carbon obtained by subjecting a carbonaceous material to be a raw material of the activated carbon to a carbonization treatment as necessary, and then subjecting the carbonaceous material to an activation treatment, and a washing treatment, a drying treatment and a pulverization treatment as necessary can also be used, for example.

The carbonaceous material to be a raw material is not particularly limited, and examples thereof include plant-based carbonaceous materials (for example, materials derived from plants such as wood, sawdust, charcoal, fruit shells such as coconut shell and walnut shell, fruit seeds, by-products in pulp production, lignin, and waste molasses), mineral-based carbonaceous materials (for example, materials derived from minerals such as peat, lignite, brown coal, bituminous coal, anthracite, coke, coal tar, coal pitch, petroleum distillation residues, and petroleum pitch), synthetic resin-based carbonaceous materials (for example, materials derived from synthetic resins such as phenol resin, polyvinylidene chloride, and acrylic resin), and natural fiber-based carbonaceous materials (for example, materials derived from natural fibers such as cellulose and regenerated fibers such as rayon). These carbonaceous materials may be used alone, or two or more types thereof may be used in combination.

Among these carbonaceous materials, coconut shell or phenol resin is preferable from the viewpoint that micropores involved in volatile organic compound removal performance specified in JIS S 3201: 2019 are easily developed.

When a carbonization treatment is required, the carbonaceous material can be usually subjected to a carbonization treatment at, for example, 400° C. to 800° C., preferably 500° C. to 800° C., more preferably about 550° C. to 750° C. in an environment in which oxygen or air is blocked.

Thereafter, the particle size of the carbonaceous material may be adjusted as necessary.

Thereafter, the carbonaceous material is subjected to an activation treatment. The activation treatment is a treatment for forming pores on the surface of the carbonaceous material to change the carbonaceous material into activated carbon which is a porous body. The activation treatment can be performed by a general method in the technical field, and is not particularly limited. Examples of the activation treatment mainly include two types of treatment methods of a gas activation treatment and a chemical activation treatment. Among them, when the carbonaceous material is used for water purification treatment, the gas activation treatment is preferable from the viewpoint of less residual impurities.

The gas activation treatment is a treatment of heating a carbonaceous material in the presence of, for example, water vapor, carbon dioxide, air, oxygen, combustion gas, or a mixed gas thereof. The heating temperature is not particularly limited, and the heating is performed at a temperature of, for example, about 700° C. to 1,100° C., preferably 800° C. to 980° C., and more preferably 850° C. to 950° C. The activation time and the temperature elevation rate are not particularly limited, and may be appropriately adjusted according to the type, shape, and size of the carbonaceous material to be selected. In consideration of safety and reactivity, it is preferable to use a gas containing water vapor in an amount of 10 vol % to 40 vol %. As the chemical activation treatment, for example, a known method of mixing an activator such as zinc chloride, calcium chloride, phosphoric acid, sulfuric acid, sodium hydroxide, potassium hydroxide, magnesium hydroxide, or calcium hydroxide with a carbonaceous material and heating the mixture under an inert gas atmosphere may be performed.

The activated carbon after the activation treatment is washed and dried as necessary. Specifically, when a plant-based carbonaceous material such as coconut shell or a mineral-based carbonaceous material, that contains impurities (alkali metal, alkaline earth metal, transition metal, and the like), is used as a raw material of the activated carbon, washing is performed as necessary in order to remove ash, chemicals, and the like. A mineral acid or water is used for washing, and hydrochloric acid having high washing efficiency is preferable as the mineral acid.

The activated carbon after the activation treatment is subjected to a pulverization treatment and/or classification treatment as necessary. The pulverization treatment can be performed by a pulverizer generally used for pulverizing activated carbon, for example, a high-speed rotating mill such as an aerofall mill, a rod mill, a roller mill, a hammer mill, a blade mill, and a pin mill, a ball mill, or a jet mill. Examples of the classification treatment include methods generally used for classification of activated carbon, for example, classification using a sieve, wet classification, and dry classification. Examples of the wet classifier include classifiers using principles such as gravity classification, inertial classification, hydraulic classification, and centrifugal classification. Examples of the dry classifier include classifiers using principles such as sedimentation classification, mechanical classification, and centrifugal classification.

The shape of the activated carbon obtained through such treatments or the commercially available activated carbon may be any shape such as a powder shape, a particle shape, and a fiber shape (thread-like, woven cloth-like, felt-like), and can be appropriately selected according to the application thereof. Among these shapes, a powder shape having high adsorption performance per volume is preferable.

(Binder)

The binder used in the adsorption filter in the present embodiment is not particularly limited, and powdered or fibrous binders can be used alone or in combination of two or more types. Among them, the binder preferably contains a fibrous binder from the viewpoint of excellent water permeability when the adsorption filter is molded.

The fibrous binder is not particularly limited as long as it can be shaped by entangling activated carbon, and can be widely used regardless of synthetic products and natural products. Examples of such a binder include acrylic fibers, polyethylene fibers, polypropylene fibers, polyacrylonitrile fibers, cellulose fibers, nylon fibers, aramid fibers, and pulp. The fiber length of the fibrous binder is preferably 4 mm or less.

The fibrous binder preferably contains an acrylic fibrous binder. Further, the fibrous binder more preferably contains a cellulose fibrous binder. Two or more types of these fibrous binders may be used in combination. For example, it is more preferable to use both the acrylic fibrous binder and the cellulose fibrous binder in combination. Combined use with the cellulose fibrous binder enables reduction in the outflow of fine powder from the adsorption filter in the present embodiment. For the blending ratio between the acrylic fibrous binder and the cellulose fibrous binder, the amount of the cellulose fibrous binder is preferably 30 parts by mass to 70 parts by mass, and more preferably 40 parts by mass to 60 parts by mass, based on 100 parts by mass of the acrylic fibrous binder.

In the present embodiment, the water permeability of the fibrous binder is preferably about 1 mL to 200 mL in terms of CSF value. The CSF value is more preferably 10 mL to 150 mL. Here, in the present specification, the CSF value is a value measured with reference to "Pulps-Determination of drainability" "Canadian standard" freeness method, specified in JIS P 8121: 2012. Specifically, the CSF value is a value evaluated using tap water having a conductivity of about 100 μs/cm in measurement. The CSF value can be adjusted, for example, by fibrillating the binder. When the CSF value of the fibrous binder is 1 mL or more, sufficient water permeability can be maintained, and a decrease in the strength of the molded body can be suppressed, so that the risk of a pressure loss can be prevented. Further, when the CSF value is 200 mL or less, the powdered activated carbon can be sufficiently retained, and a decrease in the strength of the molded body is suppressed, so that the risk of deterioration of the adsorption performance can be prevented. When two or more types of fibrous binders are used in combination, the CSF value in a state where two or more types of fibrous binders are mixed preferably satisfies the above range.

Specifically, when the fibrous binder contains an acrylic fibrous binder, the CSF value of the acrylic fibrous binder is preferably 20 mL or more, and more preferably 50 mL or more. The CSF value of the acrylic fibrous binder is preferably 200 mL or less, and more preferably 150 mL or less. Within such a range, even when the fibrous binder contains fibrous binders other than the acrylic fibrous binder, the CSF value as a whole of the fibrous binder containing the acrylic fibrous binder becomes an appropriate value. This makes it possible to improve the strength of the molded body, reduce the pressure loss, retain the powder activated carbon, and maintain the adsorption performance. From the same viewpoint, when the fibrous binder contains an acrylic fibrous binder and a cellulose fibrous binder, the CSF value of the cellulose fibrous binder in a state in which 50 parts by mass of the cellulose fibrous binder is blended with 100 parts by mass of the acrylic fibrous binder is preferably 1 mL or more, and more preferably 10 mL or more. In addition, the CSF value of the cellulose fibrous binder in a state in which 50 parts by mass of the cellulose fibrous binder is blended with 100 parts by mass of the acrylic fibrous binder is preferably 50 mL or less, and more preferably 40 mL or less.

The blending ratio between the activated carbon and the binder is not particularly limited. The blending ratio may be appropriately set so that the pore volume of pores having a pore diameter of 10 μm or more (and/or the pore volume of pores having a pore diameter of 7 μm or less and the total pore volume) falls within the specific range defined in the present embodiment when the adsorption filter is molded. For example, the amount of the binder is preferably about 3 parts by mass to 8 parts by mass based on 100 parts by mass of the activated carbon in view of the adsorption performance of the activated carbon, moldability of the adsorption filter, and the like. When the amount of the binder is 3 parts by mass or more, a molded body of an adsorption filter having sufficient strength can be obtained. When the amount of the binder is 8 parts by mass or less, deterioration of the adsorption performance of the activated carbon in the adsorption filter can be suppressed.

The mixing ratio of the binder to 100 parts by mass of the activated carbon is more preferably 4 parts by mass or more, and still more preferably 5 parts by mass or more. The mixing ratio of the binder to 100 parts by mass of the activated carbon is more preferably 7 parts by mass or less, and still more preferably 6 parts by mass or less.

(Optional Components)

Further, the adsorption filter in the present embodiment may contain other optional functional components as long as the effect of the present invention is not inhibited. Examples thereof include a zeolite-based powder (lead adsorbent) capable of adsorbing and removing soluble lead, an ion exchange resin, and a chelating resin. Further, in order to impart antibacterial properties, the adsorption filter may contain various types of adsorbents containing silver ions or a silver compound alone or in combination of two or more types thereof. An example of such adsorbents is activated carbon impregnated with silver, and such activated carbon is added in an amount that does not affect the physical properties and the like of the adsorption filter in the present embodiment. The blending amount of these other optional components is not particularly limited. The blending amount may be appropriately set so that the pore volume of pores having a pore diameter of 10 μm or more (and/or the pore volume of pores having a pore diameter of 7 μm or less and the total pore volume) falls within the specific range defined in the present embodiment when the adsorption filter is molded. The optional components can be blended in an amount of, for example, 1 part by mass to 20 parts by mass based on 100 parts by mass of the entire adsorption filter.

The adsorption filter including a molded body containing activated carbon and a binder in the present embodiment may further include a core, and the adsorption filter may be a cylindrical adsorption filter. The cylindrical shape can reduce the water flow resistance. Further, when the adsorption filter is filled in a housing and used as a cartridge as described later, there is an advantage that loading and replacement operations of the cartridge into the water purifier can be simplified.

The core is not particularly limited as long as it can be inserted into the hollow portion of the cylindrical adsorption filter to reinforce the cylindrical adsorption filter. Examples thereof include a Trical pipe, a Netron pipe, and a ceramic filter. Further, a nonwoven fabric or the like can be wrapped around the outer periphery of the core for use.

[Method for Producing Adsorption Filter]

The method for producing the adsorption filter in the present embodiment may be performed by any method known to those skilled in the art, and is not particularly limited. From the viewpoint of efficient production, a slurry suction method is preferable.

Hereinafter, an example of a method for producing the cylindrical adsorption filter in the present embodiment will be described in detail, but the method is not limited to the production method described.

Specifically, for example, the cylindrical adsorption filter (molded body) in the present embodiment can be produced by a method including a slurry preparation step, a suction filtration step, an optional rolling step, a drying step, and an optional grinding step. In the slurry preparation step, powdered activated carbon and a fibrous binder are dispersed in water to prepare a slurry. In the suction filtration step, the prepared slurry is filtered while being sucked to obtain a premolded body. In the rolling step, the shape of the outer surface of the premolded body is adjusted as necessary by compressing, on a shaping table, the premolded body after suction filtration. In the drying step, the shaped premolded body is dried to obtain a dried molded body. In the grinding step, the outer surface of the dried molded body is ground as necessary. Hereinafter, each step will be described in more detail.

(Slurry Preparation Step)

In the slurry preparation step, a slurry is prepared in which a powdered activated carbon and a fibrous binder are dispersed in a solvent such that, for example, the amount of the fibrous binder is 4 parts by mass to 8 parts by mass based on 100 parts by mass of the powdered activated carbon, and the solid content concentration of the slurry is 0.1 mass % to 10 mass %, preferably 1 mass % to 5 mass %. The solvent is not particularly limited, but water or the like is preferably used. When the solid content concentration of the slurry is adjusted to a concentration that is not too high, dispersion can be easily made uniform, and this prevent formation of mottles in the molded body. On the other hand, when the solid content concentration of the slurry is adjusted to a concentration that is not too low, the molding time can be shortened, so that the productivity can be improved. Further, such adjustment suppresses the density of the molded body from becoming too high, and can maintain good water permeability.

(Suction Filtration Step)

The suction filtration step will be described with reference to FIG. 1. In FIG. 1, reference numerals denote a mold 1, a core body 2, a suction hole 3, flanges 4 and 4', and a filtrate discharge port 5. In the suction filtration step, for example, the mold 1 for a cylindrical molded body as shown in FIG. 1 is used. The mold 1 includes: the core body 2 having a large number of the suction holes 3 on the surface thereof; the flanges 4 and 4' attached to both ends of the mold 1; and the filtrate discharge port 5. First, the core as described above is attached to the mold 1, and the mold 1 is placed in the prepared slurry. The slurry is allowed to adhere to the mold 1 by performing filtering while sucking the slurry from the inside of the mold 1 through the filtrate discharge port 5. As the suction method, a conventional method, for example, a method of performing suction by a suction pump or the like can be used. The premolded body is thus attached to the mold 1.

(Rolling Step)

After the suction filtration step, the rolling step can also be performed as necessary in order to adjust the outer diameter of the premolded body to a predetermined size, to increase the roundness of the premolded body and to reduce the unevenness of the outer peripheral surface of the premolded body. In the rolling step, the mold 1, to which the premolded body obtained in the suction filtration step is attached, may be placed on a table and moved back and forth while being pressed with a predetermined force.

The suction filtration step and the rolling step performed as necessary may be performed any number of times in order to obtain a desired pore volume, and density of the adsorption filter, or the like.

(Drying Step)

Figure 2:
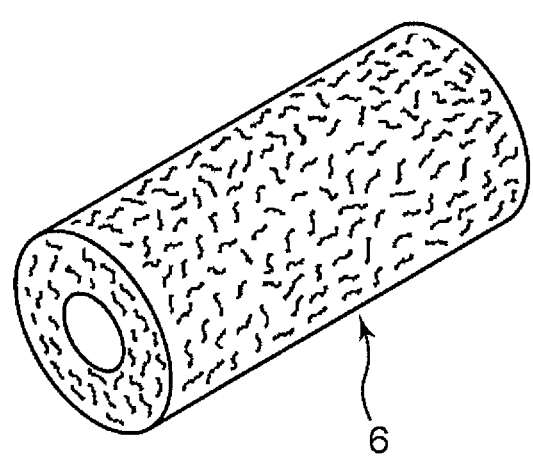
FIG. 2 is a perspective view showing an example of an adsorption filter obtained using the mold of FIG. 1 in the present embodiment.

Next, the flanges 4 and 4' at both ends of the mold 1 are removed, and the core body 2 is removed. A hollow cylindrical premolded body can be thus obtained. In the drying step, the premolded body released from the mold 1 is dried with a dryer or the like. Thus, a molded body 6 (adsorption filter in the present embodiment) shown in FIG. 2 can be obtained.

The drying temperature is, for example, about 100° C. to 150° C., and particularly about 110° C. to 130° C. The drying time is, for example, about 4 to 24 hours, and particularly about 8 to 16 hours. When the drying temperature is set to a temperature that is not too high, it is possible to prevent deterioration of filtration performance or deterioration of strength of the molded body, due to alteration or melting of the fibrous binder. When the drying temperature is set to a temperature that is not too low, the drying time can be shortened, so that insufficient drying can be prevented.

(Grinding Step)

After the drying step, the grinding step can also be performed as necessary in order to further adjust the outer diameter of the adsorption filter or in order to reduce the unevenness of the outer peripheral surface of the adsorption filter. The grinding method is not particularly limited as long as the outer surface of the dried molded body can be ground (or polished), and any grinding method known to those skilled in the art may be used. From the viewpoint of the uniformity of grinding, a method using a grinder that grinds the molded body through rotation of the molded body itself is preferable.

Note that the grinding step is not limited to a method using a grinder, and for example, a molded body fixed to a rotation shaft may be ground with a fixed flat grindstone. In this method, generated grinding scraps are easily deposited on the grinding surface, and therefore it is effective to perform grinding while blowing air.

[Application of Adsorption Filter, or the Like]

The adsorption filter in the present embodiment can be used as, for example, a water purification filter, or an artificial dialysis filter. When the adsorption filter is used as a water purification filter or an artificial dialysis filter, for example, an adsorption filter is produced by the above-described production method, then shaped and dried, and cut into a desired size and shape, and the resulting filter can be used. Further, as necessary, a cap may be attached to the tip portion of the adsorption filter or a nonwoven fabric may be attached to the surface of the adsorption filter.

The adsorption filter in the present embodiment can be used as a water purification cartridge by being filled in a housing. The water purification cartridge is loaded into a water purifier and water passes through the water purification cartridge. As a method of passing water, dead-end filtration in which the whole amount of raw water is filtrated or recirculation filtration can be adopted. The water purification cartridge loaded in the water purifier may be used by, for example, filling a water purification filter (adsorption filter in the present embodiment) in the housing. Alternatively, the water purification filter can be used by being further combined with a known nonwoven fabric filter, various types of adsorbents, mineral additive materials, ceramic filtering materials, and the like.

Although the outline of the present invention has been described above, the adsorption filter in the present embodiment is summarized as follows.

An adsorption filter according to an aspect of the present invention is an adsorption filter comprising a molded body containing activated carbon and a binder, wherein a pore volume of pores having a pore diameter of 10 μm or more on a volume basis of the adsorption filter is 0.10 cm$^3$/cc to 0.39 cm$^3$/cc, the pore volume being measured by mercury intrusion porosimetry.

In the adsorption filter described above, preferably, the density of the adsorption filter is 0.59 g/cm$^3$ or less.

In the adsorption filter described above, more preferably, the total pore volume on a volume basis of the adsorption filter is 0.50 cm$^3$/cc to 0.73 cm$^3$/cc, the total pore volume being measured by mercury intrusion porosimetry.

In the adsorption filter described above, still more preferably, the proportion of the pore volume of pores having a pore diameter of 10 μm or more on a volume basis of the adsorption filter in the total pore volume on a volume basis of the adsorption filter is 12% or more, the pore volume and the total pore volume being measured by mercury intrusion porosimetry.

In the adsorption filter described above, particularly preferably, the pore volume of pores having a pore diameter of 7 μm or less on a volume basis of the adsorption filter is 0.15 cm$^3$/cc or more, the pore volume being measured by mercury intrusion porosimetry.

In the adsorption filter described above, more preferably, the proportion of the pore volume of pores having a pore diameter of 7 μm or less on a volume basis of the adsorption filter in the total pore volume on a volume basis of the adsorption filter is 22% or more, the pore volume and the total pore volume being measured by mercury intrusion porosimetry.

An adsorption filter according to another aspect of the present invention is an adsorption filter comprising a molded body containing activated carbon and a binder, wherein a pore volume of pores having a pore diameter of 7 μm or less on a volume basis of the adsorption filter is 0.15 cm$^3$/cc or more, the pore volume being measured by mercury intrusion porosimetry; and a total pore volume on a volume basis of the adsorption filter is 0.50 cm$^3$/cc to 0.73 cm$^3$/cc, the total pore volume being measured by mercury intrusion porosimetry.

In the adsorption filter described above, preferably, the proportion of the pore volume of pores having a pore diameter of 7 μm or less on a volume basis of the adsorption filter in the total pore volume on a volume basis of the adsorption filter is 22% or more, the pore volume and the total pore volume being measured by mercury intrusion porosimetry.

In the adsorption filter described above, more preferably, the pore mode diameter measured by mercury intrusion porosimetry is 15 μm or less.

In the adsorption filter described above, still more preferably, in a carbide obtained by heat-treating the adsorption filter at 900° C. for 20 minutes in an inert gas, the content of particles having a particle size of 10 μm or less is 2 vol % or more.

In the adsorption filter described above, particularly preferably, the benzene saturated adsorption amount determined from an increase in the amount of a sample when air containing solvent vapor having a solvent saturated concentration of 1/10 is passed through the sample at 25° C. and the mass of the sample becomes constant is 18% to 35%.

In the adsorption filter described above, preferably, in a carbide obtained by heat-treating the adsorption filter at 900° C. for 20 minutes in an inert gas, the 0% particle size in volume-based cumulative particle size distribution is 7 μm or less.

In the adsorption filter described above, more preferably, the binder contains a fibrous binder.

In the adsorption filter, still more preferably, the fibrous binder contains an acrylic fibrous binder.

In the adsorption filter, particularly preferably, the fibrous binder contains a cellulose fibrous binder.

EXAMPLES

Hereinafter, the present invention will be described more specifically with reference to Examples, but the present invention is not limited by Examples at all.

First, details of the raw materials used in Examples and Comparative Examples, the method for measuring the physical properties of powdered activated carbon as a raw material, and the method for measuring and evaluating the physical properties of the produced adsorption filter will be described.

[Raw Materials of Adsorption Filter]

(Powdered Activated Carbon and Fibrous Activated Carbon)

Hereinafter, a method for producing powdered activated carbon and fibrous activated carbon, which were used as raw materials, will be described, but the production method is not particularly limited as long as necessary physical properties are satisfied.

Powdered Activated Carbon A

A coconut shell carbon obtained by carbonizing coconut shell made in the Philippines was activated by water vapor at 900° C. The activation time was adjusted so as to obtain a target benzene adsorption amount. The obtained coconut shell activated carbon was washed with dilute hydrochloric acid and desalted with ion-exchanged water to obtain granular activated carbon (JIS K 1474, 18×42 mesh, benzene adsorption amount: 29.5 wt %). The obtained granular activated carbon was pulverized in a ball mill to obtain powdered activated carbon A having a D50 of 19.5 μm.

Powdered Activated Carbon B

A coconut shell carbon obtained by carbonizing coconut shell made in the Philippines was activated by water vapor at 900° C. The activation time was adjusted so as to obtain a target benzene adsorption amount. The obtained coconut shell activated carbon was washed with dilute hydrochloric acid and desalted with ion-exchanged water to obtain granular activated carbon (JIS K 1474, 18×42 mesh, benzene adsorption amount: 30.1 wt %). The obtained granular activated carbon was pulverized in a ball mill, and fine powder was removed by a dry classifier to obtain powdered activated carbon B having a D50 of 36.8 μm.

Powdered Activated Carbon C

A coconut shell carbon obtained by carbonizing coconut shell made in the Philippines was activated by water vapor at 900° C. The activation time was adjusted so as to obtain a target benzene adsorption amount. The obtained coconut shell activated carbon was washed with dilute hydrochloric acid and desalted with ion-exchanged water to obtain granular activated carbon MS K 1474, 18×42 mesh, benzene adsorption amount: 27.9 wt %). The obtained granular activated carbon was pulverized in a ball mill, and fine powder was removed by a dry classifier to obtain powdered activated carbon C having a D50 of 33.2 μm.

Powdered Activated Carbon D

A coconut shell carbon obtained by carbonizing coconut shell made in the Philippines was activated by water vapor at 900° C. The activation time was adjusted so as to obtain a target benzene adsorption amount. The obtained coconut shell activated carbon was washed with dilute hydrochloric acid and desalted with ion-exchanged water to obtain granular activated carbon (JIS K 1474, 18×42 mesh, benzene adsorption amount: 29.7 wt %). The obtained granular activated carbon was pulverized in a ball mill and then classified with a 325 mesh sieve to obtain powdered activated carbon D having a D50 of 145.3 μm.

Powdered Activated Carbon E

Bituminous coal as a carbonaceous raw material was subjected to carbonization at 650° C. to obtain a carbonized product. The obtained carbonized product was placed in a furnace, and the activation time was adjusted so as to obtain a target benzene adsorption amount. The obtained coal-based activated carbon was washed with dilute hydrochloric acid and desalted with ion-exchanged water to obtain acid-washed activated carbon. The obtained acid-washed activated carbon was placed in the furnace again, and the activation time was adjusted so as to obtain a target benzene adsorption amount. Thus, granular activated carbon (JIS K 1474, 10×32 mesh, benzene adsorption amount: 42.1 wt %) was obtained. The obtained granular activated carbon was pulverized in a ball mill to obtain powdered activated carbon E having a D50 of 36.8 μm.

The detailed physical properties of the powdered activated carbons A to E are shown in Table 1 below.

TABLE 1

| | Physical properties of powdered activated carbon | | | | |
| | Packing density (g/cm³) | Benzene adsorption amount (wt %) | D10 (μm) | D50 (μm) | D90 (μm) |
|---|---|---|---|---|---|
| Powdered activated carbon A | 0.647 | 29.5 | 4.0 | 19.5 | 53.7 |
| Powdered activated carbon B | 0.573 | 30.1 | 19.1 | 36.8 | 67.7 |
| Powdered activated carbon C | 0.580 | 27.9 | 17.1 | 33.2 | 63.5 |
| Powdered activated carbon D | 0.492 | 29.7 | 82.6 | 145.3 | 219.4 |
| Powdered activated carbon E | 0.583 | 42.1 | 7.3 | 36.8 | 125.3 |

Fibrous Activated Carbon

A phenol resin fiber was subjected to an oxidation treatment at 300° C. for 1 hour, and the obtained oxidation-treated product was subjected to a carbonization at 700° C. for 1 hour. The obtained phenol resin fiber after the carbonization was subjected to an activation treatment at an activation temperature of 950° C. to obtain phenol resin-based fibrous activated carbon having a BET specific surface area of 1,850 m²/g.

(Binder)

Acrylic fibrous binder: "Acrylic fiber Bi-PUL/F" manufactured by Japan Exlan Co., Ltd., CSF value: 83 mL Cellulose fibrous binder (CSF value: 28 mL, the CSF value is a value in a state in which 50 parts by mass of the cellulose fibrous binder is blended with 100 parts by mass of the acrylic fibrous binder described above (CSF value: 83 mL))

Powder binder (high density polyethylene powder binder): "MIPELON MX-220" manufactured by Mitsui Chemicals, Inc.

(Others)

Titanosilicate-based lead adsorbent: "ATS" manufactured by Solenis, average particle size: 20 μm Core: "PMF-30CS-30-33" manufactured by Daiwabo Progress Co., Ltd.

Nonwoven fabric: "9540-F" manufactured by Shinwa Co., Ltd.

[Measurement of Particle Size Distribution of Activated Carbon as Raw Material]

The D10 (μm), D50 (μm) and D90 (μm), and the content (vol %) of particles having a particle size of 10 μm or less of the activated carbon as a raw material were measured by a laser diffraction scattering method. That is, activated carbon to be measured was placed in ion-exchanged water together with a surfactant, and subjected to ultrasonic vibration to prepare a uniform dispersion. Measurement was performed by a wet particle size distribution measuring apparatus ("Microtrac MT3300EX-II" manufactured by MicrotracBEL Corp.). As the surfactant, "polyoxyethylene (10) octylphenyl ether" manufactured by FUJIFILM Wako Pure Chemical Corporation was used. The analysis conditions are shown below.

(Analysis Conditions)

Number of measurements; Average value of three times
Measurement time; 30 seconds
Distribution representation; volume
Particle size section; standard
Calculation mode; MT3000II
Solvent name; WATER
Measurement upper limit; 2,000 μm, Measurement lower limit; 0.021 μm
Residual fraction ratio; 0.00
Passing fraction ratio; 0.00
Residual fraction ratio setting; invalid
Particle transmittance; absorption
Particle refractive index; N/A
Particle shape; N/A
Solvent refractive index; 1.333
DV value; 0.0882
Transmittance (TR); 0.880 to 0.900
Extension filter; invalid
Flow rate; 70%
Ultrasonic wave output; 40 W
Ultrasonic wave time; 180 seconds

[Measurement of Density of Adsorption Filter]

The density (g/cm³) of the adsorption filter was calculated according to the following equation after the obtained adsorption filter was dried at 120° C. for 2 hours. The density of the adsorption filter refers to the density of only the molded layer of activated carbon.

Density of adsorption filter=(mass of molded layer of activated carbon of adsorption filter)/(volume of molded layer of activated carbon of adsorption filter)

[Measurement of Pore Volume and Pore Mode Diameter of Adsorption Filter with Mercury Porosimeter]

Figure 3:
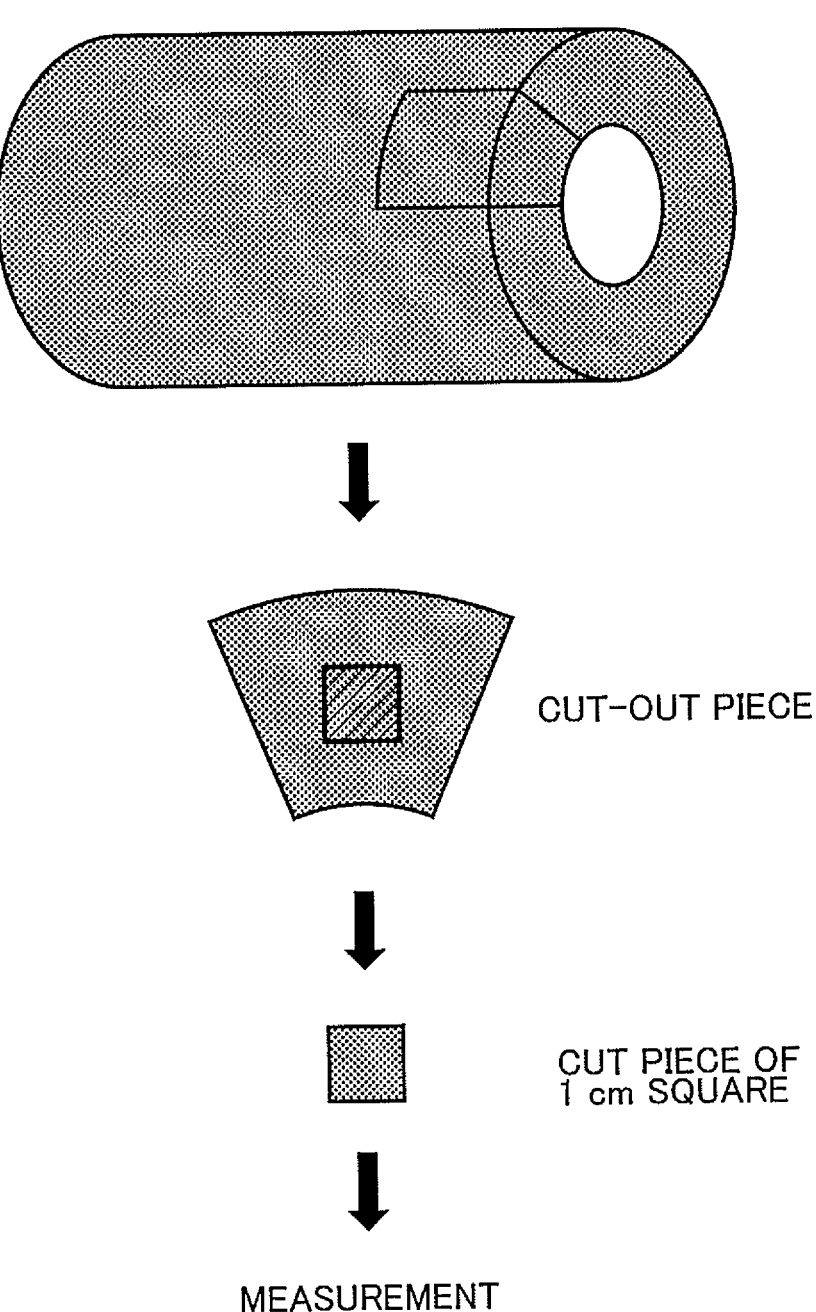
FIG. 3 is a view for describing how to cut out a sample when the pore volume and the pore mode diameter of an adsorption filter are measured.

The pore volume of the adsorption filter was measured by a mercury intrusion porosimetry pore volume measuring apparatus ("MicroActive AutoPore V 9620" manufactured by Micromeritics Instrument Corporation). The measurement pressure was 0.7 kPa to 420 MPa. The molded layer formed of activated carbon and a binder of the cylindrical adsorption filter was cut as shown in FIG. 3, and then the cut piece was further cut into a square with a size of about 1 cm. For the cut sample of about 1 cm square, the pore volume ($cm^3$/g) of pores having a pore diameter of 10 μm or more, the pore volume ($cm^3$/g) of pores having a pore diameter of 7 μm or less, and the total pore volume ($cm^3$/g) on a weight basis of the adsorption filter were calculated. Then, these values were multiplied by the obtained density of the adsorption filter, to calculate the pore volume ($cm^3$/cc) of pores having a pore diameter of 10 μm or more, the pore volume ($cm^3$/cc) of pores having a pore diameter of 7 μm or less, and the total pore volume ($cm^3$/cc) on a volume basis of the adsorption filter. Further, from the calculated values of these pore volumes, the proportion (%) of the pore volume ($cm^3$/cc) of pores having a pore diameter of 10 μm or more in the total pore volume ($cm^3$/cc) and the proportion (%) of the pore volume ($cm^3$/cc) of pores having a pore diameter of 7 μm or less in the total pore volume ($cm^3$/cc) were determined. The pore mode diameter (μm) of the adsorption filter was set to a pore size indicating the peak value of the obtained pore distribution.

[Measurement of Particle Size Distribution of Activated Carbon (Carbide after Heat Treatment) in Adsorption Filter]

Figure 4:
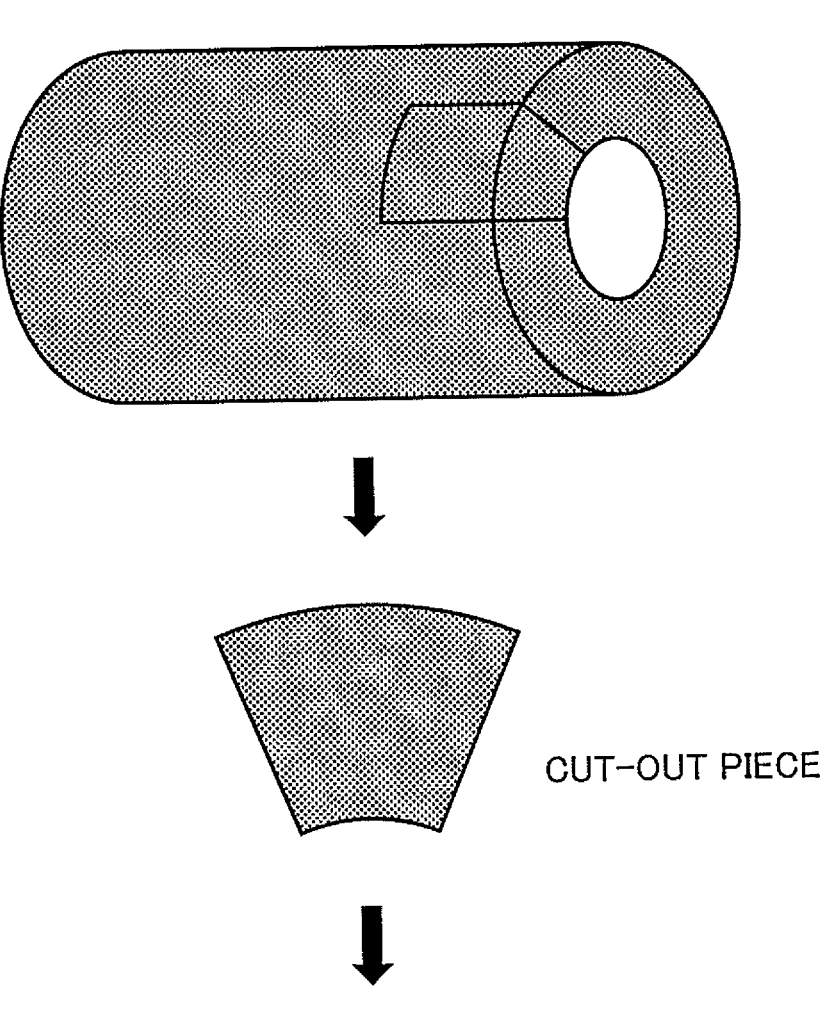
FIG. 4 is a view for describing how to cut out a measurement sample when the particle size distribution of activated carbon (carbide after heat treatment) in an adsorption filter is measured.

An adsorption filter produced in each of later-described Examples and Comparative Examples, the adsorption filter before the outer peripheral nonwoven fabric and the packing are attached, was arbitrarily cut from the end surface in the long axis direction of the filter with a cutter knife so that the volume of the cut-out piece was about 6 $cm^3$ as shown in FIG. 4 to obtain a sample. The cut sample was placed in a crucible, heat-treated at 900° C. for 20 minutes in a nitrogen atmosphere, and then cooled to room temperature in a nitrogen atmosphere. The obtained carbide was used as a sample for measuring the particle size distribution of activated carbon in the adsorption filter. The 0% particle size (D0) (μm) and the content (vol %) of particles having a particle size of 10 μm or less in volume-based cumulative particle size distribution of activated carbon in the adsorption filter were measured for the obtained sample in the same manner as in the method for measuring the particle size distribution of activated carbon as a raw material described above.

[Measurement of Benzene Adsorption Performance of Adsorption Filter]

As the benzene adsorption performance of the adsorption filter, the benzene saturated adsorption amount (%) was determined from an increase in the amount of a sample when air containing solvent vapor having a solvent saturation concentration of ¹⁄₁₀ is passed through the sample at 25° C., and the mass of the sample became constant, with reference to the activated carbon test method (JIS K 1474: 1991) in Japanese Industrial Standards. As a measurement sample, a sample obtained by cutting and pulverizing a part of an adsorption filter was used, and the adsorption performance of the sample after pulverization was evaluated.

[Measurement of Ultrafine Particle Removal Performance]

Fluorescent particles Fluoro-Max (trademark) Green Fluorescent Polymer Microspheres G500 (particle diameter: 0.5 μm) manufactured by Thermo Fisher Scientific were used to prepare diluted water having a concentration of 10,000 particles/ml or more. The temperature of the diluted water was adjusted to a temperature 20±3° C., and this was used as a test water. The test water was allowed to flow at a flow rate of 2.85 L/min from the outside to the inside of the cylindrical adsorption filter, and the test water and the treated water were simultaneously collected over time to obtain sample waters. The sample waters were each filtered through a 0.2 μm membrane filter (MEMBRANE FILTER A020B025A WHITE (cellulose-mixed ester, 0.2 μm, 25 mm, with black ruled line) manufactured by ADVANTEC), and the membrane filter was dried at 60° C. The membrane filter after drying was fixed on a slide glass and observed with a fluorescence microscope ("BX51-34-FL" manufactured by OLYMPUS Corporation), and the number of fluorescent particles in both sample waters were determined. The removal ratio (%) at which particles contained in the test water have been removed by the treatment was calculated. In this test of removal performance, the removal ratio of fluorescent particles when 10,940 L of water was passed was evaluated, and a removal ratio of 95% or more was used as an acceptance criterion in the ultrafine particle removal performance.

[Measurement of Initial Water Flow Resistance]

Water at 20±3° C. was passed from the outside to the inside of the cylindrical adsorption filter at a flow rate of 2.85 L/min, and the water flow resistance (MPa) was measured 10 minutes after the start of water passage. In this test, an initial water flow resistance of 0.2 MPa or less was defined as an acceptance criterion. The value of the water flow resistance was a value obtained by excluding the resistance by the housing.

[Measurement of Chloroform (Harmful Substance) Removal Performance]

Test water with a chloroform concentration of 300 ppb was allowed to flow at 20±2.5° C. from the outside to the inside of the cylindrical adsorption filter at a flow rate of 2.85 L/min. The integrated water passing amount (L) at the time when the removal ratio of chloroform reached less than 95% was evaluated as chloroform removal performance.

[Measurement of Fine Powder Amount after Water Passing]

Water was passed through the cylindrical adsorption filter at a flow rate of 2.85 L/min, and 100 ml of outflow water immediately after water passing was collected. The absorbance of the collected outflow water was measured by an ultraviolet visible spectrophotometer ("UV-1800" manufactured by Shimadzu Corporation). Then, the amount of fine powder in the outflow water was determined from a calibration curve prepared in advance.

Next, a method for producing an adsorption filter in each of Examples and Comparative Examples, and physical property measurement results and performance evaluation results of the produced adsorption filter will be described in detail.

Example 1

Powdered activated carbon A, powdered activated carbon B, an acrylic fibrous binder, a cellulose fibrous binder, and a titanosilicate-based lead adsorbent were prepared so that the total amount thereof was 1.055 kg at the blending ratio shown in Table 2 below, and tap water was added. The amount of slurry after addition was 20 L. In Table 2, the content (vol %) of particles having a particle size of 10 μm or less of the activated carbon as a raw material, the content being measured by the method described above, is also shown.

Figure 5:
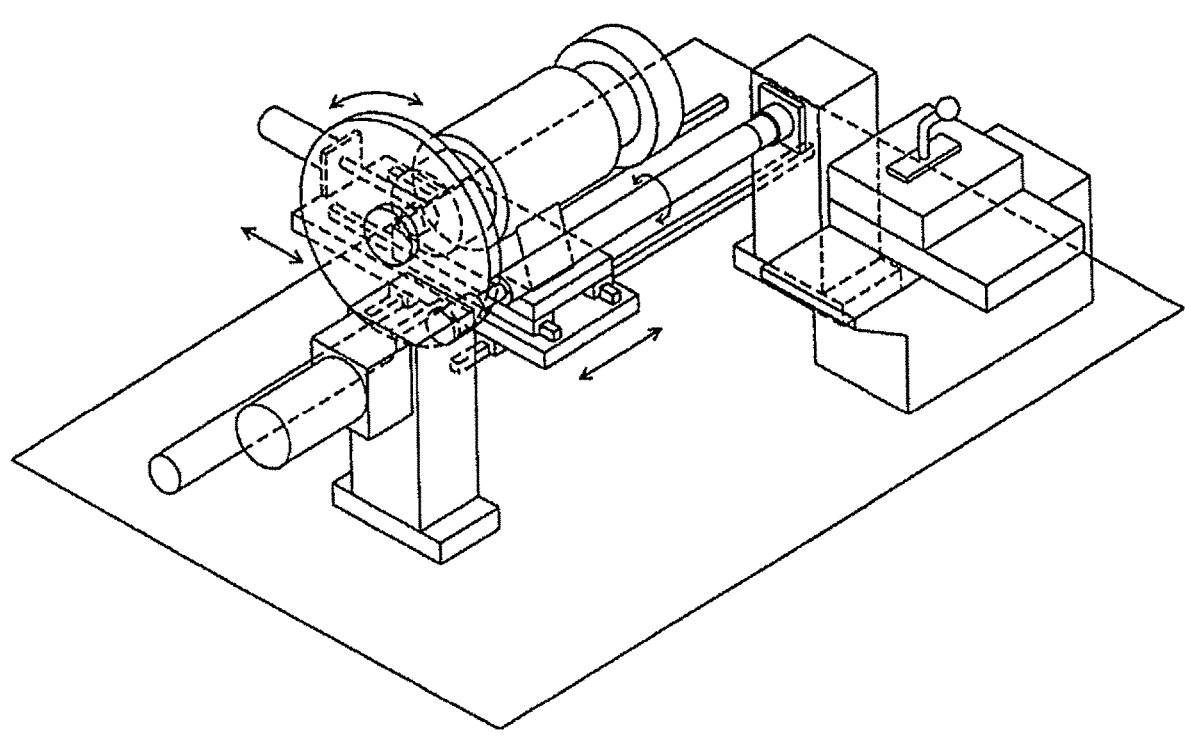
FIG. 5 is a perspective view showing an example of an automatic grinder for producing an adsorption filter.

Next, a core was attached to the mold for cylindrical molding (outer diameter: 60 mm, center shaft diameter: 30 mm, inter-flange distance: 84.9 mm) shown in FIG. 1 described above. The obtained slurry was only sucked at 450 mmHg up to 62 mm which is slightly larger than the outer diameter of the mold, thereby molding a molded body, and the molded body was then dried. Then, the obtained molded body was mounted on an automatic grinder shown in FIG. 5. The outer surface of the molded body was ground at a rotational speed of molding body of 360 rpm, a rotational speed of grindstone of 2,535 rpm, and a moving speed of grindstone of 300 mm/10 sec (3 cm/sec) to obtain a cylindrical adsorption filter having an outer diameter of 60 mm, an inner diameter of 30 mm, and a height of 84.9 mm.

For the adsorption filter thus obtained, the density of the adsorption filter, the pore volume and pore mode diameter measured by a mercury porosimeter, the particle size distribution of activated carbon (carbide after heat treatment) in the adsorption filter, and the benzene adsorption performance were measured by the above-described methods. The results of the physical property measurements of these adsorption filters are summarized in Table 3 below.

Thereafter, a single layer of a nonwoven fabric was wrapped around the outer periphery of the obtained adsorption filter. Further, a packing formed by punching out a foamed polyethylene sheet having a thickness of 2 mm, the packing having a donut shape with an outer diameter of 60 mm and an inner diameter of 30 mm, was bonded to both ends of the adsorption filter with a hot melt adhesive.

An adsorption filter, in which a nonwoven fabric has been wound and packings have been bonded, was loaded into a stainless steel housing having an average diameter of 96 mm, a length of about 240 mm, and an internal capacity of about 1,809 cm³. With this housing, water was passed from the outside to the inside. The ultrafine particle removal performance, initial water flow resistance, chloroform (harmful substance) removal performance, and fine powder amount after water passing were evaluated by the above-described method. These performance evaluation results are also summarized in Table 3 below.

Example 2

As shown in Table 2 below, in Example 2, a cylindrical adsorption filter was obtained in the same manner as in Example 1 except that the cellulose fibrous binder was not blended in the raw material. The physical property measurement results and performance evaluation results of the adsorption filter in Example 2 are summarized in Table 3 below.

Example 3

As shown in Table 2 below, in Example 3, a cylindrical adsorption filter was obtained in the same manner as in Example 1 except that in the blending amount of the powdered activated carbon, the amount of the powdered activated carbon A was slightly increased and the amount of the powdered activated carbon B was slightly decreased as compared with Example 1. The physical property measurement results and performance evaluation results of the adsorption filter in Example 3 are summarized in Table 3 below.

Example 4

As shown in Table 2 below, in Example 4, a cylindrical adsorption filter was obtained in the same manner as in Example 3 except that in the blending amount of the powdered activated carbon, the amount of the powdered activated carbon A was further increased and the amount of the powdered activated carbon B was further decreased as compared with Example 3. The physical property measurement results and performance evaluation results of the adsorption filter in Example 4 are summarized in Table 3 below.

Example 5

As shown in Table 2 below, in Example 5, a cylindrical adsorption filter was obtained in the same manner as in Example 1 except that the powdered activated carbon A was changed to the powdered activated carbon E and the blending amount was changed. The physical property measurement results and performance evaluation results of the adsorption filter in Example 5 are summarized in Table 3 below.

Example 6

As shown in Table 2 below, in Example 6, the blending conditions were the same as those in Example 1. In Example 6, a cylindrical adsorption filter was obtained in the same manner as in Example 1 except that when the adsorption filter was molded, the obtained slurry was sucked at 450 mmHg up to 70 mm which is larger than the outer diameter of the mold, thereby molding a molded body, and then the surface of the molded body was shaped in the rolling step until the outer diameter of the molded body reached 63 mm, followed by drying. The physical property measurement results and performance evaluation results of the adsorption filter in Example 6 are summarized in Table 3 below.

Example 7

As shown in Table 2 below, in Example 7, a cylindrical adsorption filter was obtained in the same manner as in Example 1 except that a titanosilicate-based lead adsorbent was not blended.

The physical property measurement results and performance evaluation results of the adsorption filter in Example 7 are summarized in Table 3 below.

Comparative Example 1

As shown in Table 2 below, in Comparative Example 1, a cylindrical adsorption filter was obtained in the same manner as in Example 1 except that the powdered activated carbon A was not contained and only the powdered activated carbon B was used in the blending of the powdered activated carbon. The physical property measurement results and performance evaluation results of the adsorption filter in Comparative Example 1 are summarized in Table 3 below.

Comparative Example 2

Powdered activated carbon A, powdered activated carbon B, and a titanosilicate-based lead adsorbent were mixed at the blending ratio shown in Table 2 below to obtain a mixed powder of 1.6 kg in total. Further, 0.4 kg of high density polyethylene powder binder corresponding to the blending ratio shown in Table 2 below was added to the mixed powder. Thereafter, this mixed powder was charged into a micro speed mixer ("MS-25 model" manufactured by Takara Koki) and stirred for 2 minutes. Next, the obtained mixture was filled into a cylindrical stainless steel mold with a lid on one side thereof, the mold having an inner diameter of 65 mm, a core diameter of 30 mm, and a height of 90 mm, little by little while applying vibration with a mallet, and the content was fixed by closing the open side with a lid. The mold filled with the mixture was charged into a dryer at 160° C., heated for 120 minutes, and then cooled to 50° C. or lower. Thereafter, the lid was removed, and the molded product was released from the mold so as not to break the molded product. Next, the obtained molded product was cut to prepare a dry molded body having an outer diameter of 65 mm, an inner diameter of 30 mm, and a height of 84 mm. Finally, both ends of the obtained molded body were cut with a saw to prepare an adsorption filter having a height of 64 mm. The physical property measurement results and performance evaluation results of the adsorption filter in Comparative Example 2 are summarized in Table 3 below.

Comparative Example 3

Into a 100 L small beater, 1.5 kg of fibrous activated carbon in terms of dry weight and 100 L of tap water were charged. Then, 0.075 kg of an acrylic fibrous binder in terms of dry weight was charged therein, and beating was performed. Specifically, the fibrous activated carbon and the binder were mixed for dispersion, and further, a clearance between the fixed tooth and the rotating tooth of the beater was narrowed to subdivide the fibrous activated carbon. When the fiber length of the fibrous activated carbon is shortened by subdividing, the packing property is improved when the fibrous activated carbon is molded into a specific shape, so that the weight per unit volume increases. The weight per unit volume was called beating density, and was used as a measure of the shortness of the fibrous activated carbon. In order to measure the beating density, the following molded body was prepared. Specifically, a 300 mesh wire net was wrapped around a center shaft having a suction small hole diameter of 3 mm and a pitch of 5 mm to prepare a mold having a center shaft diameter of 18 mmΦ, an outer diameter of 40 mm, and an inter-flange distance of 50 mm. The slurry was sucked from the center portion of the mold to prepare a molded body of a cylindrical adsorption filter. The beating density was calculated from the dimension and weight of the dried product of this molded body to be 0.183 g/ml. In Comparative Example 3, this slurry having a beating density of 0.183 g/ml was used as a standard slurry.

In Comparative Example 3, a cylindrical adsorption filter was obtained in the same manner as in Example 1 except that in the blending of raw materials, a predetermined amount of powdered activated carbon C was added to this standard slurry so as to have the blending ratio shown in Table 2 below. The physical property measurement results and performance evaluation results of the adsorption filter in Comparative Example 3 are summarized in Table 3 below.

Comparative Example 4

In Comparative Example 4, a cylindrical adsorption filter was obtained in the same manner as in Comparative Example 2 except that in the blending of raw materials, powdered activated carbon D, a titanosilicate-based lead adsorbent, and a high density polyethylene powder binder were used at the blending ratio shown in Table 2 below. The physical property measurement results and performance evaluation results of the adsorption filter in Comparative Example 4 are summarized in Table 4 below.

TABLE 2

| | Blending ratio | | | | | | | | | | Physical properties of activated carbon as raw material |
| --- | --- | --- | --- | --- | --- | --- | --- | --- | --- | --- | --- |
| | Powdered activated carbon A part by mass | Powdered activated carbon B part by mass | Powdered activated carbon C part by mass | Powdered activated carbon D part by mass | Powdered activated carbon E part by mass | Fibrous activated carbon part by mass | Titano-silicate-based lead adsorbent part by mass | Acrylic fibrous binder part by mass | Cellulose fibrous binder part by mass | High density polyethylene powder binder part by mass | Content of particles having particle size of 10 μm or less vol % |
| Example 1 | 16 | 72 | — | — | — | — | 12 | 3 | 1.5 | — | 3.5 |
| Example 2 | 16 | 72 | — | — | — | — | 12 | 4.5 | — | — | 3.5 |
| Example 3 | 32 | 56 | — | — | — | — | 12 | 3 | 1.5 | — | 8.7 |
| Example 4 | 42 | 46 | — | — | — | — | 12 | 3 | 1.5 | — | 11.7 |
| Example 5 | — | 63 | — | — | 25 | — | 12 | 3 | 1.5 | — | 3.2 |
| Example 6 | 16 | 72 | — | — | — | — | 12 | 3 | 1.5 | — | 3.4 |
| Example 7 | 18 | 82 | — | — | — | — | — | 3 | 1.5 | — | 3.0 |
| Comparative Example 1 | — | 88 | — | — | — | — | 12 | 3 | 1.5 | — | 0.2 |
| Comparative Example 2 | 13 | 57 | — | — | — | — | 10 | — | — | 20 | 3.4 |
| Comparative Example 3 | — | — | 75 | — | — | 25 | — | 7.5 | — | — | 1.3 |
| Comparative Example 4 | — | — | — | 70 | — | — | 10 | — | — | 20 | 0.0 |

In Table 2 above, "—" means not contained.

TABLE 3

Adsorption filter physical properties

Mercury porosimeter

| | Density g/cm³ | Pore volume of pores having pore diameter of 10 μm or more | | Proportion of pore volume of pores having pore diameter of 10 μm or more | Pore volume of pores having pore diameter of 7 μm or less | | Proportion of pore volume of pores having pore diameter of 7 μm or less | Total pore volume | | Pore mode diameter μm |
|---|---|---|---|---|---|---|---|---|---|---|
| | | cm³/g (based on filter weight) | cm³/cc (based on filter volume) | % (based on filter volume) | cm³/g (based on filter weight) | cm³/cc (based on filter volume) | % (based on filter volume) | cm³/g (based on filter weight) | cm³/cc (based on filter volume) | |
| Example 1 | 0.43 | 0.76 | 0.32 | 48.9 | 0.47 | 0.20 | 30.2 | 1.55 | 0.66 | 11.3 |
| Example 2 | 0.43 | 0.72 | 0.31 | 49.5 | 0.43 | 0.18 | 29.5 | 1.45 | 0.62 | 11.3 |
| Example 3 | 0.44 | 0.52 | 0.23 | 36.9 | 0.52 | 0.23 | 37.2 | 1.41 | 0.62 | 9.1 |
| Example 4 | 0.46 | 0.44 | 0.20 | 32.0 | 0.60 | 0.28 | 43.4 | 1.39 | 0.63 | 9.1 |
| Example 5 | 0.39 | 0.78 | 0.31 | 53.4 | 0.40 | 0.16 | 27.2 | 1.46 | 0.57 | 13.9 |
| Example 6 | 0.50 | 0.44 | 0.22 | 38.6 | 0.45 | 0.23 | 39.8 | 1.14 | 0.57 | 9.1 |
| Example 7 | 0.41 | 0.87 | 0.35 | 53.8 | 0.45 | 0.18 | 27.7 | 1.62 | 0.66 | 11.3 |
| Comparative Example 1 | 0.41 | 0.96 | 0.40 | 60.7 | 0.33 | 0.14 | 21.0 | 1.59 | 0.65 | 11.3 |
| Comparative Example 2 | 0.60 | 0.09 | 0.06 | 116 | 0.40 | 0.24 | 49.2 | 0.81 | 0.49 | 6.0 |
| Comparative Example 3 | 0.29 | 2.09 | 0.60 | 81.2 | 0.27 | 0.08 | 10.4 | 2.57 | 0.74 | 13.9 |

| | Adsorption filter physical properties | | | Adsorption filter performance | | | |
|---|---|---|---|---|---|---|---|
| | Particle size distribution of activated carbon (Particle size distribution of carbide after heat treatment) | | Benzene adsorption performance % | Chloroform removal performance *Removal ratio 95% % | Ultrafine particle removal performance *Removal ratio in 10,940 L water passage L | Fine powder amount after water passing *Immediately after water passage mg/L | Initial water flow resistance *Flow rate 2.85 L/min MPa |
| | D 0 μm | Content of particles having particle size of 10 μm or less vol % | | | | | |
| Example 1 | 4.7 | 2.4 | 26.0 | 1940 | 98.9 | 19.0 | 0.045 |
| Example 2 | 3.9 | 3.2 | 25.9 | 1930 | 97.4 | 24.5 | 0.045 |
| Example 3 | 2.3 | 6.8 | 25.8 | 2000 | 99.7 | 32.8 | 0.073 |
| Example 4 | 2.0 | 9.0 | 23.3 | 1800 | 99.6 | 14.3 | 0.08 |
| Example 5 | 4.7 | 2.5 | 28.9 | 1440 | 99.5 | 7.0 | 0.046 |
| Example 6 | 4.7 | 2.8 | 26.3 | 2480 | 99 | 7.2 | 0.104 |
| Example 7 | 4.7 | 2.6 | 22.0 | 2210 | 97.9 | 4.0 | 0.037 |
| Comparative Example 1 | 7.8 | 0.6 | 26.1 | 1900 | 91.1 | 23.5 | 0.035 |
| Comparative Example 2 | 3.9 | 2.7 | 18.1 | 1930 | Stopped halfway due to increased resistance | 55.8 | 0.222 |
| Comparative Example 3 | 7.8 | 0.9 | 24.3 | 1190 | 53 | 2.7 | 0.018 |

TABLE 4

| | | Adsorption filter physical properties | | | | | | | |
| --- | --- | --- | --- | --- | --- | --- | --- | --- | --- |
| | | Mercury porosimeter | | | | | | | Particle size distribution of activated carbon (Particle size distribution of carbide after heat treatment) |
| | | Pore volume of pores having pore diameter of 7 μm or less | | Proportion of pore volume of pores having pore diameter of 7 μm or less | Total pore volume | | | | Content of |
| | Density g/cm³ | cm³/g (based on filter weight) | cm³/cc (based on filter volume) | % (based on filter volume) | cm³/g (based on filter weight) | cm³/cc (based on filter volume) | Pore mode diameter μm | D 0 μm | particles having particle size of 10 μm or less vol % |
| Comparative Example 4 | 0.55 | 0.2 | 0.11 | 21.4 | 0.92 | 0.5 | 13.9 | 22.1 | 0 |

| | Adsorption filter performance | | | | |
| --- | --- | --- | --- | --- | --- |
| | Adsorption filter physical properties Benzene adsorption performance % | Chloroform removal performance *Removal ratio 95% L | Ultrafine particle removal performance *Removal ratio in 10,940 L water passage % | Fine powder amount after water passing *Immediately after water passage mg/L | Initial water flow resistance *Flow rate 2.85 L/min MPa |
| Comparative Example 4 | 18 | 1230 | 39.4 | 78.1 | 0.047 |

Figure 6:
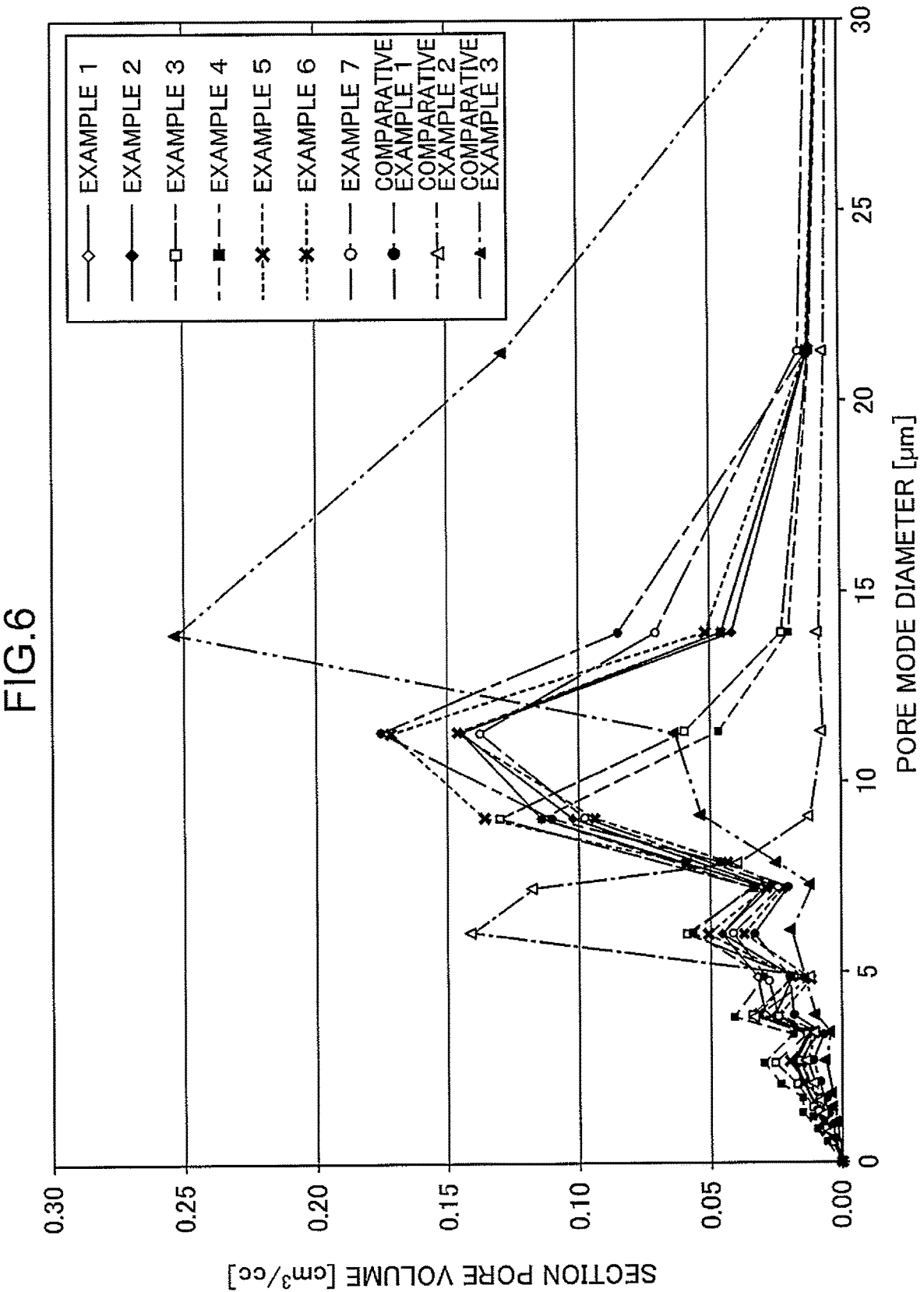
FIG. 6 is a graph showing the pore mode diameter of an adsorption filter and a section pore volume thereof.

Further, FIG. 6 shows a graph of the pore mode diameter and the section pore volume measured by a mercury porosimeter in the adsorption filters in Examples 1 to 7 and Comparative Examples 1 to 3.

Figure 7:
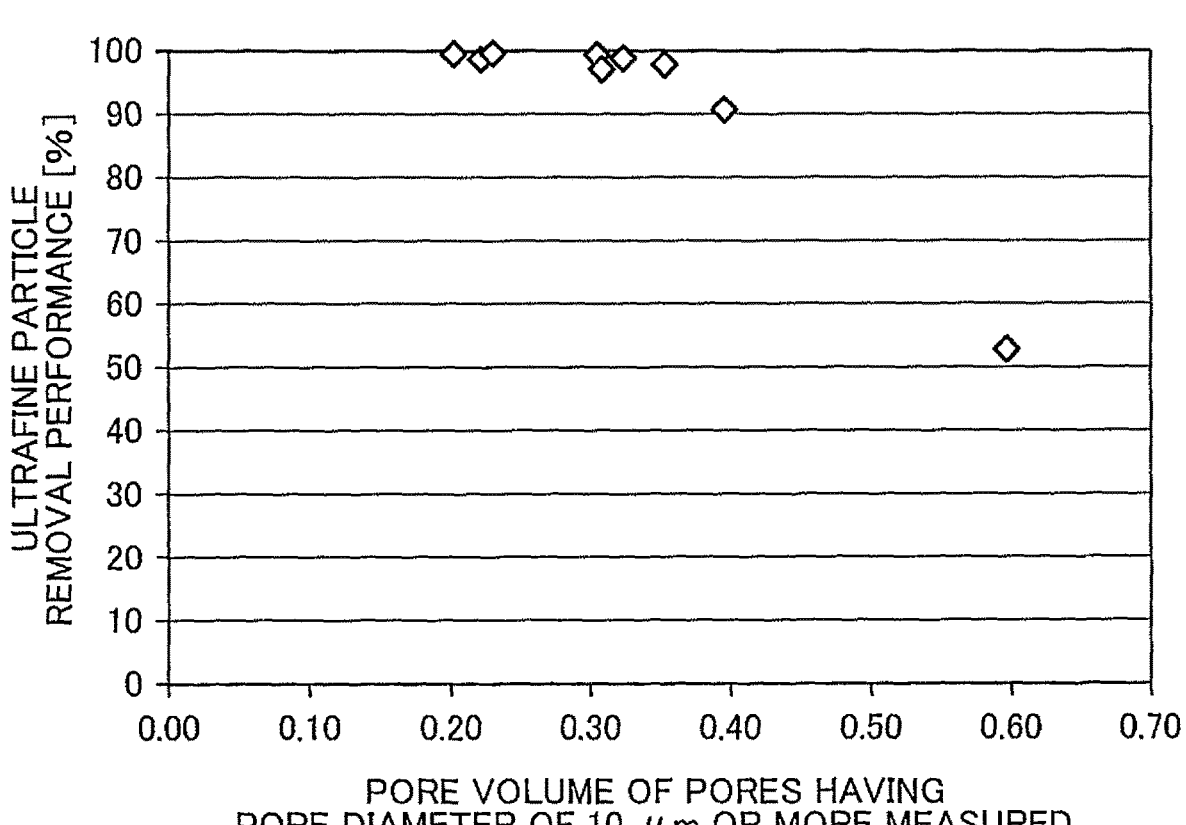
FIG. 7 is a graph showing a correlation between the pore volume of pores having a pore diameter of 10 μm or more and ultrafine particle removal performance of an adsorption filter.
Figure 8:
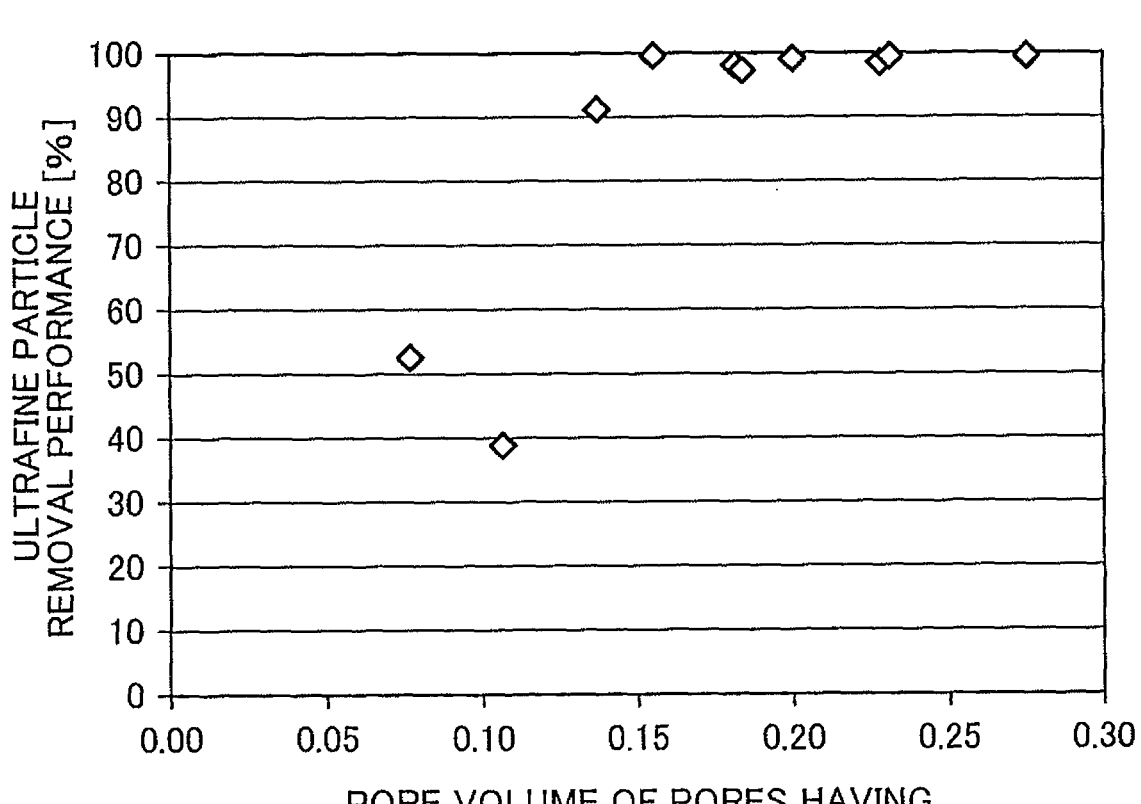
FIG. 8 is a graph showing a correlation between the pore volume of pores having a pore diameter of 7 μm or less and ultrafine particle removal performance of an adsorption filter.

In addition, FIG. 7 shows the correlation between the pore volume (cm³/cc) of pores having a pore diameter of 10 μm or more measured by a mercury porosimeter and the ultrafine particle removal performance (%) in the adsorption filters in Examples 1 to 7 and Comparative Examples 1 and 3. FIG. 8 shows the correlation between the pore volume (cm³/cc) of pores having a pore diameter of 7 μm or less and the ultrafine particle removal performance (%) measured by a mercury porosimeter in Examples 1 to 7 and Comparative Examples 1 and 3 to 4. Comparative Example 2 is not shown because the water passing was stopped halfway as shown in Table 3.

As shown in FIG. 7, when the pore volume of pores having a pore diameter of 10 μm or more was about 0.39 (cm³/cc) or less, excellent ultrafine particle removal performance was exhibited. Furthermore, as shown in FIG. 8, according to the results of this example, when the pore volume of pores having a pore diameter of 7 μm or less was about 0.15 (cm³/cc) or more, excellent ultrafine particle removal performance was exhibited.

DISCUSSION

As shown in Table 3 above, the adsorption filters of Examples 1 to 7 had excellent ultrafine particle removal performance and maintained good water permeability. On the other hand, the adsorption filter of Comparative Example 1 did not satisfy the acceptance criterion for the ultrafine particle removal performance, and the adsorption filter of Comparative Example 2 did not satisfy the acceptance criterion for the initial water flow resistance. In comparison between Example 1 and Comparative Example 1, the adsorption filter of Comparative Example 1 did not satisfy both the prescribed range of the pore volume of pores having a pore diameter of 10 μm or more and the prescribed range of the pore volume of pores having a pore diameter of 7 μm or less in the present embodiment, although the total pore volume and the pore mode diameter were comparable numerical values. Specifically, FIG. 6 shows that, in the pore distribution of Comparative Example 1, a larger number of pores are present in the direction in which the pore diameter is larger, specifically, in the range of the pore diameter of 10 μm or more, as compared with the pore distribution of Example 1. Further, FIG. 6 shows that, in the pore distribution of Comparative Example 1, a smaller number of pores are present in the direction in which the pore diameter is smaller, specifically, in the range of the pore diameter of 7 μm or less, as compared with the pore distribution of Example 1. Therefore, it is assumed that there is a difference in the effect of the ultrafine particle removal performance. As described above, in the adsorption filters of Examples 1 to 7, it is assumed that the pore volume of pores having a pore diameter of 10 μm or more and the pore volume of pores having a pore diameter of 7 μm or less of the adsorption filter were suitably controlled.

This application is based on Japanese Patent Application No. 2020-167069 filed on Oct. 1, 2020, the contents of which are incorporated in the present application.

In order to express the present invention, the present invention has been appropriately and sufficiently described through the embodiments and examples with reference to specific examples and the like in the foregoing, but it should be recognized that a person skilled in the art can easily change and/or improve the above-described embodiments and examples. Therefore, unless a change or improvement made by a person skilled in the art is at a level that departs from the scope of the claims described in the claims, the change or improvement is interpreted to be included in the scope of the claims.

INDUSTRIAL APPLICABILITY

The adsorption filter of the present invention, when used as a water purification filter, or the like, exhibits excellent ultrafine particle removal performance while maintaining good water permeability.

The invention claimed is:

1. An adsorption filter comprising a molded body containing activated carbon and a binder,
   wherein a pore volume of pores having a pore diameter of 10 μm or more on a volume basis of the adsorption filter is 0.10 cm³/cc to 0.39 cm³/cc, the pore volume being measured by mercury intrusion porosimetry, and
   wherein a total pore volume on a volume basis of the adsorption filter is 0.50 cm³/cc to 0.73 cm³/cc, the total pore volume being measured by mercury intrusion porosimetry.

2. The adsorption filter according to claim 1, wherein a density of the adsorption filter is 0.59 g/cm³ or less.

3. The adsorption filter according to claim 1, wherein the pore volume of pores having a pore diameter of 10 μm or more on a volume basis of the adsorption filter is 0.15 cm³/cc to 0.35 cm³/cc and the total pore volume on a volume basis of the adsorption filter is 0.53 cm³/cc to 0.70 cm³/cc.

4. The adsorption filter according to claim 1, wherein a proportion of a pore volume of pores having a pore diameter of 10 μm or more on a volume basis of the adsorption filter in a total pore volume on a volume basis of the adsorption filter is 12% or more, the pore volume and the total pore volume being measured by mercury intrusion porosimetry.

5. The adsorption filter according to claim 1, wherein a pore volume of pores having a pore diameter of 7 μm or less on a volume basis of the adsorption filter is 0.15 cm³/cc or more, the pore volume being measured by mercury intrusion porosimetry.

6. The adsorption filter according to claim 1, wherein a proportion of a pore volume of pores having a pore diameter of 7 μm or less on a volume basis of the adsorption filter in a total pore volume on a volume basis of the adsorption filter is 22% or more, the pore volume and the total pore volume being measured by mercury intrusion porosimetry.

7. An adsorption filter comprising a molded body containing activated carbon and a binder, wherein
   a pore volume of pores having a pore diameter of 7 μm or less on a volume basis of the adsorption filter is 0.15 cm³/cc or more, the pore volume being measured by mercury intrusion porosimetry; and
   a total pore volume on a volume basis of the adsorption filter is 0.50 cm³/cc to 0.73 cm³/cc, the total pore volume being measured by mercury intrusion porosimetry.

8. The adsorption filter according to claim 7, wherein a proportion of a pore volume of pores having a pore diameter of 7 μm or less on a volume basis of the adsorption filter in a total pore volume on a volume basis of the adsorption filter is 22% or more, the pore volume and the total pore volume being measured by mercury intrusion porosimetry.

9. The adsorption filter according to claim 1, wherein a pore mode diameter measured by mercury intrusion porosimetry is 15 μm or less.

10. The adsorption filter according to claim 1, wherein in a carbide obtained by heat-treating the adsorption filter at 900° C. for 20 minutes in an inert gas, a content of particles having a particle size of 10 μm or less is 2 vol % or more.

11. The adsorption filter according to claim 1, wherein a benzene saturated adsorption amount determined from an increase in an amount of a sample when air containing solvent vapor having a solvent saturated concentration of 1/10 is passed through the sample at 25° C. and a mass of the sample becomes constant is 18% to 35%.

12. The adsorption filter according to claim 1, wherein in a carbide obtained by heat-treating the adsorption filter at 900° C. for 20 minutes in an inert gas, a 0% particle size in volume-based cumulative particle size distribution is 7 μm or less.

13. The adsorption filter according to claim 1, wherein the binder contains a fibrous binder.

14. The adsorption filter according to claim 13, wherein the fibrous binder contains an acrylic fibrous binder.

15. The adsorption filter according to claim 13, wherein the fibrous binder contains a cellulose fibrous binder.

16. The adsorption filter according to claim 7, wherein a pore mode diameter measured by mercury intrusion porosimetry is 15 μm or less.

17. The adsorption filter according to claim 7, wherein in a carbide obtained by heat-treating the adsorption filter at 900° C. for 20 minutes in an inert gas, a content of particles having a particle size of 10 μm or less is 2 vol % or more.

18. The adsorption filter according to claim 7, wherein a benzene saturated adsorption amount determined from an increase in an amount of a sample when air containing solvent vapor having a solvent saturated concentration of 1/10 is passed through the sample at 25° C. and a mass of the sample becomes constant is 18% to 35%.

19. The adsorption filter according to claim 7, wherein in a carbide obtained by heat-treating the adsorption filter at 900° C. for 20 minutes in an inert gas, a 0% particle size in volume-based cumulative particle size distribution is 7 μm or less.

20. The adsorption filter according to claim 1, wherein the total pore volume on a volume basis of the adsorption filter is 0.56 cm³/cc to 0.67 cm³/cc.

* * * * *